United States Patent
Stumpf et al.

(10) Patent No.: US 11,192,491 B2
(45) Date of Patent: Dec. 7, 2021

(54) TRAILER FOR TRANSPORTING FLUID

(71) Applicant: Fuelie Systems, Inc., Lewes, DE (US)

(72) Inventors: Thomas R. Stumpf, Chapel Hill, NC (US); Paul Seales, Port Isabel, TX (US)

(73) Assignee: FUELIE SYSTEMS, INC., Lewes, DE (US)

( * ) Notice: Subject to any disclaimer, the term of this patent is extended or adjusted under 35 U.S.C. 154(b) by 0 days.

(21) Appl. No.: 16/753,484

(22) PCT Filed: Oct. 3, 2018

(86) PCT No.: PCT/US2018/054135
§ 371 (c)(1),
(2) Date: Apr. 3, 2020

(87) PCT Pub. No.: WO2019/070832
PCT Pub. Date: Apr. 11, 2019

(65) Prior Publication Data
US 2020/0324683 A1 Oct. 15, 2020

Related U.S. Application Data

(60) Provisional application No. 62/685,644, filed on Jun. 15, 2018, provisional application No. 62/613,965, (Continued)

(51) Int. Cl.
*B60P 3/22* (2006.01)
*B67D 7/84* (2010.01)

(52) U.S. Cl.
CPC ............ *B60P 3/2205* (2013.01); *B67D 7/845* (2013.01); *B60P 3/2235* (2013.01)

(58) Field of Classification Search
CPC ............................ B60P 3/2235; B60P 3/2205
See application file for complete search history.

(56) References Cited

U.S. PATENT DOCUMENTS

| 2,732,839 A | 1/1956 | Elder |
| 2,777,606 A | 1/1957 | Moore et al. |

(Continued)

FOREIGN PATENT DOCUMENTS

| GB | 2049572 A | 12/1980 |
| GB | 2086812 A | 5/1982 |

(Continued)

OTHER PUBLICATIONS

JME Ellsworth, "Western Global 500 Gallon ABBI Mobile Refueler UL Transport Tank Trailer With Transfer Pump Package", pp. 1-6, retrieved on Nov. 14, 2018, retrieved from internet: https://www.jmesales.com/western-global-500-gallon-abbi-mobile-refueler-ul-transport-tank-trailer-with-transfer-pump-package/.

(Continued)

*Primary Examiner* — Kevin Hurley
(74) *Attorney, Agent, or Firm* — Coats & Bennett, PLLC

(57) ABSTRACT

A trailer that includes a tank with an enclosed interior space configured to hold fluid. The trailer can include a chassis that supports the tank and wheels for moving to desired locations. The tank can include planar opposing sides with rounded corners. One or more baffles can be located within the interior space. The baffles restrict the movement of the fluid within the interior space while the trailer is being moved between locations. This restriction reduces the forces that the moving fluid exerts on the tank which could cause damage to the tank that could result in leaks and failure.

19 Claims, 24 Drawing Sheets

Related U.S. Application Data filed on Jan. 5, 2018, provisional application No. 62/568,665, filed on Oct. 5, 2017.

(56) References Cited

U.S. PATENT DOCUMENTS

| | | | | |
|---|---|---|---|---|
| 2,826,421 | A * | 3/1958 | Mueller | B60P 3/2225 |
| | | | | 280/832 |
| 3,050,315 | A | 8/1962 | Kindler et al. | |
| 3,645,416 | A | 2/1972 | Main, Jr. | |
| 4,007,765 | A | 2/1977 | Bellows | |
| 5,494,191 | A | 2/1996 | Benson | |
| 5,782,493 | A * | 7/1998 | Bolton | B60P 3/426 |
| | | | | 220/563 |
| 6,564,961 | B1 | 5/2003 | Klein | |
| 6,923,475 | B1 * | 8/2005 | Martin | B60D 1/143 |
| | | | | 280/490.1 |
| 7,300,073 | B2 | 11/2007 | Bachman | |
| 7,475,910 | B1 * | 1/2009 | Calonge | B60P 3/2235 |
| | | | | 280/830 |
| D759,546 | S | 6/2016 | Van Wyk | |
| D759,547 | S | 6/2016 | Van Wyk | |
| 9,616,798 | B2 | 4/2017 | Stumpf | |
| 2003/0230585 | A1 | 12/2003 | Hagenbuch | |
| 2005/0115621 | A1 * | 6/2005 | Van Vliet | B60P 3/2205 |
| | | | | 137/899 |
| 2006/0097508 | A1 * | 5/2006 | Bachman | B60P 3/2295 |
| | | | | 280/837 |
| 2006/0249947 | A1 * | 11/2006 | Michael | B29C 41/386 |
| | | | | 280/837 |
| 2007/0000545 | A1 | 1/2007 | Cannon et al. | |
| 2010/0015369 | A1 | 1/2010 | Schröder et al. | |
| 2013/0328298 | A1 * | 12/2013 | Thomas | B60P 3/221 |
| | | | | 280/837 |
| 2014/0103628 | A1 | 4/2014 | De Biasi et al. | |
| 2014/0217716 | A1 * | 8/2014 | Reynolds | B65D 90/52 |
| | | | | 280/830 |
| 2014/0263085 | A1 | 9/2014 | Mitchell et al. | |
| 2018/0025345 | A1 * | 1/2018 | Kittoe | G06Q 20/20 |
| | | | | 705/41 |
| 2018/0229993 | A1 | 8/2018 | Van Wyk | |

FOREIGN PATENT DOCUMENTS

| | | |
|---|---|---|
| WO | 2004009391 A1 | 1/2004 |
| WO | 2005002993 A1 | 1/2005 |
| WO | 2019070800 A1 | 4/2019 |

OTHER PUBLICATIONS

Henrich Fuel Equipment, "Western Global RT20 Transcube Highway Trailer", pp. 1-2, retrieved on Nov. 14, 2018, retrieved from internet: https://henrichinc.com/shop/western-global-transcube-rt20.html.

Fuelpro, "FuelPROTrailers.com Brochure", Jan. 1, 2017, pp. 1-12, retrieved on Nov. 26, 2018, retrieved from internet: https://www.dropbox.com/s/8r5d7a2jlli6llo/FuelPRO%20brochure%20%5B2019%5D%5B4%5D.pdf?dl=0.

Womack Machine Supply Company, "Hydraulic Filter Beta Ratings and the Multi-Pass Test", Jan. 1, 1990, pp. 1-5, retrieved on Mar. 25, 2019, retrieved from internet: https://www.womackmachine.com/engineering-toolbox/data-sheets/hydraulic-filter-beta-ratings-and-the-multi-pass-test/.

Parker Hannifin Corporation, "The Micron Rating for Fluid Filters", pp. 1-3, retrieved on Aug. 26, 2019, retrieved from internet: https://www.parker.com/literature/Racor/Mobile_The_Micron_Rating.pdf.

\* cited by examiner

TRAILER FOR TRANSPORTING FLUID

RELATED APPLICATIONS

This application claims the benefit of U.S. Provisional Application Nos. 62/568,665 filed Oct. 5, 2017, 62/613,965 filed Jan. 5, 2018, and 62/685,644 filed Jun. 15, 2018, the disclosures of which are incorporated by reference herein in their entireties.

BACKGROUND

Various fuel trailers are known for storing and supplying fuel at a desired location. One example includes a motorized vehicle with an attached fuel storage tank, such as a tanker truck. In use, the vehicle is loaded with fuel and then driven to the desired location where the fuel is dispensed. A similar example is a tank trailer that includes a fuel tank supported on a trailer platform and configured to be towed behind a vehicle. Another example is a fuel container sized to be handled by a user. The container includes an enclosed interior of usually less than a fifteen gallon fuel capacity and includes an exterior handle to facilitate movement. During use, the container is filled with fuel and then lifted and moved by the user to the desired location where fuel is dispensed. Each of these various types of fuel trailers has limited application.

SUMMARY

The application is directed to a device to store and transport fluid. One context is a trailer that is configured to be pulled by a vehicle.

One aspect is directed to a trailer to store and transport fluid. The trailer includes a chassis; wheels mounted to the chassis to move the trailer; and a tank with an enclosed interior space to contain a fluid with the tank comprising opposing pairs of planar sides comprising first and second lateral sides, top and bottom sides, and front and back sides.

In another aspect, the interior space comprises a substantially rectangular sectional shape in a plane perpendicular to an axis that extends through the front and back sides with the rectangular sectional shape comprising rounded corners in the plane.

In another aspect, the tank comprises eight rounded corners.

In another aspect, the tank comprises rounded corners and rounded edges that extend between the corners.

In another aspect, the tank is constructed from aluminum.

In another aspect, the trailer includes one or more cabinets mounted to the chassis at the front side of the tank with the one or more cabinets each comprising an interior and a door that is movable between an open position and a closed position.

In another aspect, the tank comprises a width measured between the first and second lateral sides, a height measured between the top and bottom sides, and a length measured between the front and back sides, with the tank having a length that is greater than the height and the width.

In another aspect, the tank comprises a middle section constructed from first and second sheets that each includes a bend, and first and second end sections that are connected to opposing ends of the middle section.

In another aspect, the trailer includes at least one baffle positioned within the interior space between the front and back sides with the at least one baffle configured to hinder movement of the fluid within the interior space.

In another aspect, each of the at least one baffle is connected to each of the first and second lateral sides and each of the top and bottom sides, each of the at least one baffle comprises one or more openings that allow the fluid to move through the baffle within the interior space.

In another aspect, the at least one baffle includes an opening and a gate is positioned at the opening with the gate is configured to be movable with an actuator between an open position away from the opening and a closed position extending across the opening.

In another aspect, the chassis further includes a hitch at a front end to attach the chassis to a vehicle.

One aspect is directed to a trailer to store and transport fluid. The trailer includes a tank with an enclosed interior space to contain a fluid with the tank including pairs of opposing planar sides with first and second lateral sides, top and bottom sides, and front and back sides. Baffles are positioned within the interior space between the front and back sides. A chassis supports the tank. Wheels are mounted to the chassis.

In another aspect, at least one of the baffles includes an opening and a gate is positioned at the opening with the gate is configured to be movable with an actuator between an open position away from the opening and a closed position extending across the opening.

In another aspect, the tank includes rounded corners and rounded edges that extend between the corners.

In another aspect, the tank includes eight rounded corners.

In another aspect, the tank includes a width measured between the first and second lateral sides, a height measured between the top and bottom sides, and a length measured between the front and back sides with the tank having a length that is greater than the height and the width.

In another aspect, the chassis further includes a hitch at a front end to attach the chassis to a vehicle.

In another aspect, the interior space includes a substantially rectangular sectional shape in a plane perpendicular to an axis that extends through the front and back sides with the rectangular sectional shape comprising rounded corners in the plane.

In another aspect, one or more cabinets are mounted to the chassis at the front side of the tank with the one or more cabinets each including an interior and a door that is movable between an open position and a closed position.

In another aspect, the tank includes a middle section constructed from first and second sheets that each include a bend and first and second end sections that are connected to opposing ends of the middle section.

One aspect is directed to a trailer to store and transport fluid. The trailer includes a tank with an enclosed interior space having a substantially rectangular sectional shape with rounded corners. A chassis supports the tank. Wheels are mounted to the chassis.

In another aspect, baffles are positioned within the interior space to hinder movement of the fluid within the interior space between a front side of the tank and a back side of the tank.

In another aspect, at least one of the baffles includes an opening and a gate is positioned at the opening with the gate configured to be movable with an actuator between an open position away from the opening and a closed position extending across the opening.

In another aspect, the chassis further includes a hitch at a front end to attach the chassis to a vehicle.

In another aspect, the tank includes rounded edges that extend between the rounded corners.

In another aspect, the tank includes eight rounded corners.

In another aspect, one or more cabinets are mounted to the chassis with the one or more cabinets each including an interior and a door that is movable between an open position and a closed position.

In another aspect, the tank includes a middle section constructed from first and second sheets that each includes a bend and first and second end sections that are connected to opposing ends of the middle section.

One aspect is directed to a method of making a trailer that is configured to store and transport fluid. The method includes forming a tank with planar sides and rounded corners and edges between the sides. The method includes securing the tank to a wheeled chassis.

In another aspect, the method includes forming a middle section of the tank from two sheets that each includes an intermediate bend that extends between exposed edges.

In another aspect, the method includes attaching baffles to one or more of the planar sides with the baffles aligned to be positioned within an interior space of the tank.

In another aspect, the method includes spacing the baffles apart along a length of the tank between a front side and a back side.

In another aspect, the method includes mounting a gate to one of the baffles at an opening in the baffle with the gate being movable between a closed position that extends across the opening and an open position away from the opening.

In another aspect, the method includes mounting a hitch at a front end of the chassis with the hitch configured to be attached to a vehicle to pull the trailer.

In another aspect, the method includes forming the tank with a rectangular sectional shape and the rounded corners.

In another aspect, the method includes attaching one or more cabinets to the chassis in proximity to the tank.

In another aspect, the method includes forming the tank with a length that is greater than a height and a width.

One aspect is directed to a method of making a trailer that is configured to store and transport fluid. The method includes bending first and second sheets with each of the sheets including two planar sections and an intermediate bend that extends a longitudinal length of the sheet. The method includes welding together along two weld seams exposed edges of the first and second sheets and forming a tubular structure with open first and second ends. The method includes welding a first end section to the first end of the tubular structure and welding a second end section to the second end of the tubular structure and forming an enclosed interior space that contains a fluid. The method includes mounting the tubular structure to a wheeled chassis with the first end facing towards a front the chassis and the second end facing towards a back to the chassis.

In another aspect, the method includes forming rounded corners on the tank.

In another aspect, the method includes attaching baffles within an interior of the tubular structure between the first and second ends.

In another aspect, the method includes spacing the baffles apart along a length of the tank between the first and second ends.

In another aspect, the method includes mounting a gate to one of the baffles at an opening in the baffle with the gate being movable between a closed position that extends across the opening and an open position away from the opening.

In another aspect, the method includes mounting a hitch at a front end of the chassis with the hitch configured to be attached to a vehicle to pull the trailer.

In another aspect, the method includes attaching one or more cabinets to the chassis in proximity to the tank.

One aspect is directed to a portable fueling trailer that comprises a frame, an axle and wheels attached to the frame, a fuel tank mounted to the frame and that comprises an enclosed interior space to contain fuel, and a fuel system downstream from the fuel tank to move the fuel from the fuel tank. The fuel system comprises: filters each configured to remove contaminants from the fuel; redundant first and second fuel lines that each comprise a pump to move the fuel; a connector downstream from the first and second fuel lines with a pair of inlets to receive the fuel from the first and second fuel lines and a single outlet downstream from the pair of inlets; and a dispensing end positioned downstream from the single outlet.

In another aspect, a first one of the filters is located on the first fuel line and a second one of the filters is located on the second fuel line.

In another aspect, one of the filters is a particulate filter and a second one of the filters is an organic filter, with the particulate filter being positioned upstream from the organic filter.

In another aspect, one of the filters is a coalescing filter to remove water from the fuel.

In another aspect, the first fuel line comprises a first valve and the second fuel line comprises a second valve with each of the first and second valves configured to stop the fuel from moving along the respective fuel line.

In another aspect, a return fuel line extends between the fuel system downstream from the single outlet and the fuel tank with the return fuel line configured to return the fuel to the fuel tank after the fuel has moved through the fuel system.

In another aspect, a valve is positioned at an intersection of the return fuel line and the fuel system with the valve configured to direct the fuel towards one of the dispensing end and the return fuel line.

In another aspect, the fuel system comprises a first section with a single fuel line and a second section with the redundant first and second fuel lines with the first section being spaced from the second section.

In another aspect, an input line connects to the fuel system downstream from the fuel tank and upstream from the plurality of filters with the input line configured to introduce outside fuel into the fuel system.

In another aspect, an input line pump is positioned on the input line to move the outside fuel along the input line and into the fuel system.

In another aspect, a valve is positioned along the fuel system between the fuel tank and the input line with the valve preventing the outside fuel from moving upstream along the fuel system and into the fuel tank.

In another aspect, the frame further comprises a hitch mounted to a front of the frame to pull the portable fueling trailer with a vehicle.

In another aspect, sensors are positioned along the fuel line and the fuel tank; and a control system comprises a processing circuit and a communications interface circuit with the control system configured to receive signals from the sensors and adjust one or more of the pumps to adjust the flow rate of the fuel moving through the fuel system.

In another aspect, the control system is configured to shut down the pump in the first fuel line when a fuel flow rate through the first fuel line is below a predetermined threshold.

In another aspect, the control system is configured to increase a rate of the pump in the second fuel line when the pump in the first fuel line is shut down.

In another aspect, a control system comprising a processing circuit and a communications interface circuit is configured to receive signals from sensors in the fuel system and adjust one or more of the pumps to adjust the flow rate of the fuel moving through the fuel system.

In another aspect, the control system is configured to receive signals from a remote source and in response to the signals move the fuel from the fuel tank and through the fuel system and return the fuel to the fuel tank.

In another aspect, the control system is configured to periodically move the fuel through the fuel system and return the fuel to the fuel tank to maintain the fuel in a usable state.

One aspect is directed to a portable fueling trailer that comprises a frame, an axle and wheels attached to the frame, a fuel tank mounted to the frame with the fuel tank comprising an enclosed interior space to contain fuel, and a fuel system to move the fuel from the fuel tank. The fuel system comprises: first and second filters that remove contaminants from the fuel; redundant first and second fuel lines positioned downstream from the first and second filters with each of the first and second fuel lines having a pump and a third filter configured to remove additional contaminants from the fuel; a connector with a pair of inlets to receive the fuel from the first and second fuel lines and a single outlet downstream from the pair of inlets; and a dispensing end positioned downstream from the connector to dispense the fuel.

In another aspect, the first filter is a particulate filter and the second filter is an organic filter with the first filter being positioned upstream from the second filter.

In another aspect, the third filter is a coalescing filter to remove water from the fuel.

In another aspect, the first fuel line comprises a first valve and the second fuel line comprises a second valve with each of the first and second valves configured to stop the fuel from moving along the respective fuel line.

In another aspect, a return line extends between the fuel system downstream from the single outlet and the fuel tank with the return line configured to return the fuel to the fuel tank that has moved through the fuel system.

In another aspect, a valve is positioned at an intersection of the return line and the fuel system with the valve configured to direct the fuel towards one of the dispensing end and the return fuel line.

In another aspect, an input line connects to the fuel system downstream from the fuel tank and upstream from the filters with the input line configured to introduce outside fuel into the fuel system.

In another aspect, an input line pump is positioned on the input line to move the outside fuel along the input line and into the fuel system.

In another aspect, a valve is positioned along the fuel system between the fuel tank and the input line with the valve preventing the outside fuel from moving upstream along the fuel system and into the fuel tank.

In another aspect, sensors are positioned at the fuel line and the fuel tank; and a control system comprises a processing circuit and a communications interface circuit with the control system configured to receive signals from the sensors and adjust one or more of the pumps to adjust the flow rate of the fuel moving through the fuel system.

In another aspect, the control system is configured to shut down the pump in the first fuel line when a fuel flow rate through the first fuel line is below a predetermined threshold.

In another aspect, the control system is configured to increase a rate of the pump in the second fuel line after the pump in the first fuel line is shut down.

In another aspect, a control system comprises a processing circuit and a communications interface circuit with the control system configured to receive signals from sensors in the fuel system and adjust one or more of the pumps to adjust the flow rate of the fuel moving through the fuel system.

In another aspect, the control system is configured to receive signals from a remote source and in response to the signals move the fuel from the fuel tank and through the fuel system and return the fuel to the fuel tank.

In another aspect, the control system is configured to periodically move the fuel through the fuel system and return the fuel to the fuel tank to maintain the fuel in a usable state.

One aspect is directed to a portable fueling trailer that comprises a frame, an axle and wheels attached to the frame, a fuel tank mounted to the frame with the fuel tank comprising an enclosed interior space to contain fuel, and a fuel system attached to the fuel tank to move the fuel from the fuel tank. The fuel system comprises: a plurality of filters each configured to remove contaminants from the fuel; redundant first and second fuel lines that each comprise a pump to move the fuel; a connector downstream from the first and second fuel lines with a pair of inlets to receive the fuel from the first and second fuel lines and a single outlet downstream from the pair of inlets; and a dispensing end downstream from the connector. Sensors are positioned in the fuel tank and the fuel system. A control system comprises a processing circuit and a communications interface circuit with the control system configured to receive signals from the sensors to adjust one or more of the pumps to adjust the flow rate of the fuel moving through the fuel system.

In another aspect, one or more of the sensors are configured to detect a temperature of the fuel.

In another aspect, the control system is configured to activate the pumps and to move the fuel through the fuel system when the fuel has been stored in the fuel tank for a predetermined time.

In another aspect, the control system is configured to: after receiving a request to dispense fuel, activate the pumps and to move the fuel from the fuel tank and through the fuel system and return the fuel to the fuel tank; and after the fuel is returned to the fuel tank, moving the fuel again through the fuel system and dispensing the fuel through the dispensing end.

In another aspect, the control system is configured to: filter the fuel at a first frequency by moving the fuel from the fuel tank, through the fuel system, and back into the fuel tank; determine that the temperature of the fuel is above a predetermined threshold; and in response to the temperature being above the predetermined threshold, increasing the frequency of filtering the fuel.

One aspect is directed to a method of using a portable fueling trailer. The method comprises: wheeling a fueling trailer to a desired geographic location; moving fuel from a fuel tank in the fueling trailer through a plurality of filters and removing contaminants from the fuel; moving with a first pump a first portion of the fuel through a first fuel line and filtering the first portion of the fuel; while moving the first portion of the fuel through the first fuel line, simultaneously pumping with a second pump a remaining second portion of the fuel through a second fuel line and filtering the second portion of the fuel; moving the first and second portions of the fuel from the first and second fuel lines and into a single fuel line; and dispensing the fuel from the single fuel line.

In another aspect, the method comprises moving the fuel from the fuel tank through the plurality of filters with the first and second pumps and removing the contaminants from the fuel.

In another aspect, the method comprises prior to dispensing the fuel from the single fuel line, moving the fuel from the single fuel line and through a return line and back into the fuel tank.

In another aspect, the method comprises introducing outside fuel into an input line and into the fueling trailer downstream from the fuel tank and upstream from the plurality of filters and moving the outside fuel through the plurality of filters.

In another aspect, the method comprises preventing the outside fuel from moving into the fuel tank prior to moving the outside fuel through the plurality of filters.

In another aspect, the method comprises after wheeling the fueling trailer to the desired geographic location, detaching the fueling trailer from a vehicle and moving the fueling from the fuel tank.

One aspect is directed to a method of using a portable fueling trailer. The method comprises: wheeling a fueling trailer to a desired geographic location; moving fuel from a fuel tank and through a fuel system comprising: moving the fuel through a plurality of filters and removing contaminants from the fuel; moving a first portion of the fuel through a first fuel line and filtering the first portion of the fuel; while moving the first portion of the fuel through the first fuel line, simultaneously moving a second portion of the fuel through a second fuel line and filtering the second portion of the fuel; and moving the first and second portions of the fuel from the first and second fuel lines and into a single fuel line.

In another aspect, the method comprises returning the fuel to the storage tank through an input line that bypasses the plurality of filters and the first and second fuel lines prior to dispensing the fuel through a dispensing end on the single fuel line.

In another aspect, the method comprises determining that the fuel has been in the fuel tank beyond a predetermined time period and moving the fuel from the fuel tank and through the fuel system and then returning the fuel to the fuel tank.

In another aspect, the method comprises sensing one of water and contaminants in the fuel and in response moving the fuel from the fuel tank and through the fuel system.

In another aspect, the method comprises sensing that a temperature of the fuel in the fuel tank exceeds a predetermined level and in response moving the fuel from the fuel tank and through the fuel system.

In another aspect, the method comprises determining that a fuel flow rate of the fuel moving through the fuel system is below a predetermined rate and shutting down a pump in one of the first fuel line and the second fuel line.

In another aspect, the method comprises in response to shutting down the pump in one of the first fuel line and the second fuel line, increasing the speed of the other pump.

In another aspect, the method comprises moving the fuel from the fuel tank and through the fuel system in response to receiving a fueling request.

In another aspect, the method comprises receiving a fueling request from an outside source; determining that a required amount of fuel is available in the fuel tank and a processing time for preparing the fuel for dispensing; transmitting a message to the outside source and beginning to move the fuel from the fuel tank through the fuel system; and dispensing the fuel when the outside source arrives at the portable fueling trailer.

One aspect is directed to a fueling network comprising a plurality of portable fueling trailers and a central controller. The plurality of portable fueling trailers each comprises: a frame; an axle and wheels attached to the frame; a fuel tank mounted to the frame, the fuel tank comprising an enclosed interior space to contain fuel; a fuel system downstream from the fuel tank to move the fuel from the fuel tank with the fuel system comprising: a plurality of filters each configured to remove contaminants from the fuel; redundant first and second fuel lines that each comprise a pump to move the fuel; a connector downstream from the first and second fuel lines with a pair of inlets to receive the fuel from the first and second fuel lines and a single outlet downstream from the pair of inlets; and a dispensing end positioned downstream from the single outlet. The central controller comprises a processing circuit and a communications interface circuit with the control system configured to communicate with each of the portable fueling trailers. The central controller is configured to: receive a fueling request from an outside source; determine which one of the portable fueling trailers is able to provide the fuel to the outside source; and transmit a signal to the outside source indicating the portable fueling trailer that will be supplying the fuel.

In another aspect, the central controller further comprises a communication interface circuitry to send and receive signals with the outside source and with the plurality of portable fueling trailers.

One aspect is directed to a method of supplying fuel to an outside source. The method comprises: receiving a fueling request from an outside source; determining which one of a plurality of portable fueling trailers that are positioned in a network is able to provide the fuel to the outside source. Each of the portable fueling trailers comprises: a frame; an axle and wheels attached to the frame; a fuel tank mounted to the frame, the fuel tank comprising an enclosed interior space to contain fuel; a fuel system downstream from the fuel tank to move the fuel from the fuel tank. The fuel system comprises: a plurality of filters each configured to remove contaminants from the fuel; redundant first and second fuel lines that each comprise a pump to move the fuel; and a connector downstream from the first and second fuel lines with a pair of inlets to receive the fuel from the first and second fuel lines and a single outlet downstream from the pair of inlets; and a dispensing end positioned downstream from the single outlet. The method also comprises: transmitting a signal to the outside source indicating the portable fueling trailer that will be supplying the fuel; receiving fuel dispensing information from the portable fueling trailer indicating an amount of fuel that is dispensed to the outside source; and updating fuel information of the portable fueling trailer.

In another aspect, the method comprises monitoring an amount of fuel at each of the portable fueling trailers.

In another aspect, receiving the fueling request from the outside source comprises receiving at least one of an amount of needed fuel, a time when the fuel is needed, and a current location of the outside source.

In another aspect, determining which one of the plurality of portable fueling trailers is able to provide the fuel to the outside source comprises determining which one of the portable fueling trailers is closest to the outside source when the fueling request is received.

In another aspect, the method comprises sending a passcode to the outside source to activate the portable fueling trailer.

One aspect is directed to a trailer to store and move fluid. The trailer includes a tank with an enclosed interior space. The tank includes pairs of opposing planar sides including first and second lateral sides, top and bottom sides, and front and back sides. A chassis supports the tank. Wheels are mounted to the chassis to allow the trailer to be pulled.

In another aspect, the opposing planar sides comprise a rectangular sectional shape when viewed across a longitudinal axis of the tank that extends through the front and back sides.

In another aspect, the tank includes rounded corners that extend between the opposing planar sides.

In another aspect, the tank is constructed from aluminum to allow for the trailer to have a reduced weight.

In another aspect, the tank is constructed from aluminum sheets with a thickness of ¼" to allow for the trailer to have a reduced weight.

In another aspect, the tank is constructed from first and second sheets that are welded together along longitudinal seams and first and second end sections that are welded to ends of the first and second sheets.

In another aspect, at least one baffle is positioned within the interior space to hinder movement of a fluid within the interior space.

In another aspect, a plurality of the baffles are positioned along a length of the interior space between the front and back sides.

In another aspect, at least one of the baffles is connected to each of the planar sides of the tank and includes one or more openings that allow the fluid to move through the baffle within the interior space.

In another aspect, the tank includes rounded corners at intersections between the opposing planar sides.

In another aspect, the tank comprises eight of the rounded corners.

One aspect is directed to a trailer to store and move fluid. The trailer includes an aluminum tank with an enclosed interior space. The tank includes pairs of opposing planar sides including first and second lateral sides, top and bottom sides, and front and back sides. Baffles are positioned in the interior space between the front and back sides. A chassis supports the tank. Wheels are mounted to the chassis to allow the trailer to be pulled.

In another aspect, the sides each include a thickness of ¼".

In another aspect, the tank includes rounded edges at intersections between the sides with the rounded edges reducing stress risers applied by the fluid within the interior space.

In another aspect, the tank includes rounded corners at intersections of the sides.

One aspect is directed to a trailer to store and move fluid. The trailer includes an aluminum tank with an enclosed interior space. The tank includes a rectangular sectional shape. A chassis supports the tank. Wheels are mounted to the chassis to allow the trailer to be pulled.

In another aspect, baffles are positioned in the interior space between front and back sides.

One aspect is directed to a method of making a trailer configured to store and move fluid. The method includes: forming a tank with planar sides and rounded edges and corners between the sides; and securing the tank to a chassis with the chassis including wheels.

In another aspect, the method includes forming the tank from aluminum.

In another aspect, the method includes attaching baffles within an interior space of the tank with the baffles being spaced apart along a length of the tank.

One aspect is directed to a method of making a trailer configured to store and move fluid. The method includes: longitudinally bending first and second sheets; welding together exposed ends of first and second sheets and forming a tubular structure that includes two weld seams and two bends that extend along a longitudinal length with the tubular structure having open first and second ends; welding a first end section to the first end of the tubular structure; and welding a second end section to the second end of the tubular structure and forming an enclosed interior space that holds the fluid.

In another aspect, the method includes forming the tubular structure to include a rectangular sectional shape.

In another aspect, the method includes forming rounded edges along the longitudinal length.

In another aspect, the method includes forming rounded corners on the tank.

DETAILED DESCRIPTION

Figure 1:
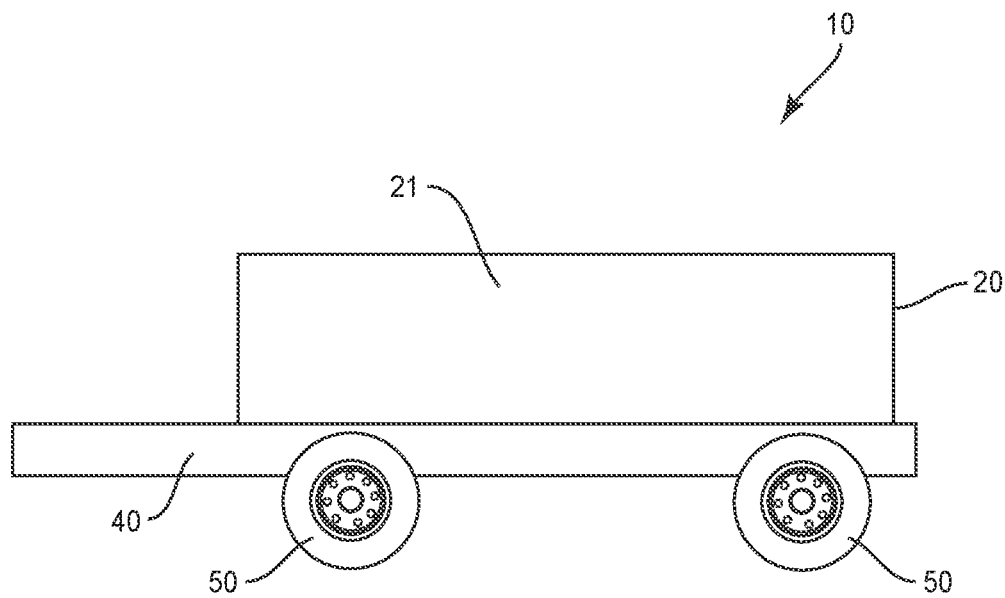
FIG. 1 is a schematic side view of a trailer.
Figure 2:
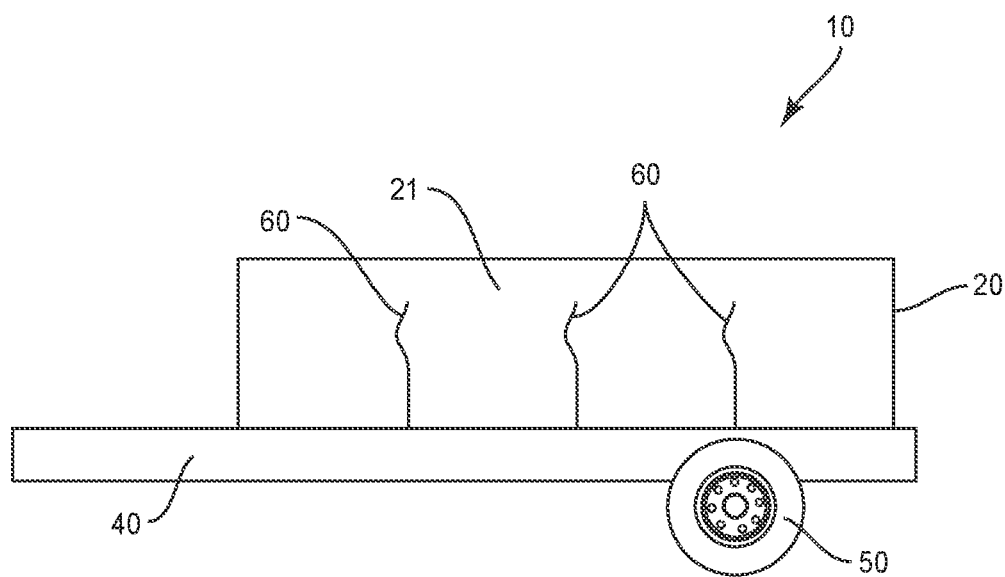
FIG. 2 is a schematic side view of a trailer.

FIG. 1 schematically illustrates a device 10 configured to contain and transport fluid. FIG. 1 specifically discloses a trailer 10, although the application is directed to additional types of devices 10 that can store and transport fluid. The trailer 10 of FIG. 1 includes a tank 20 with an enclosed interior space 21 configured to hold fluid. One context includes the tank 20 containing fuel. The trailer 10 also includes a chassis 40 that supports the tank 20 and with wheels 50 for moving to desired locations. FIG. 2 schematically illustrates another trailer 10 that includes a tank 20 with an interior space 21, a chassis 40 and wheels 50. In addition, one or more baffles 60 are located within the interior space 21. The baffles 60 restrict the movement of the fluid within the interior space 21 while the trailer 10 is being moved between locations. This restriction reduces the forces that the moving fluid within the interior space 21 exerts on the tank 20 which cause damage to the tank 10 that could result in leaks and failure.

Figure 3:
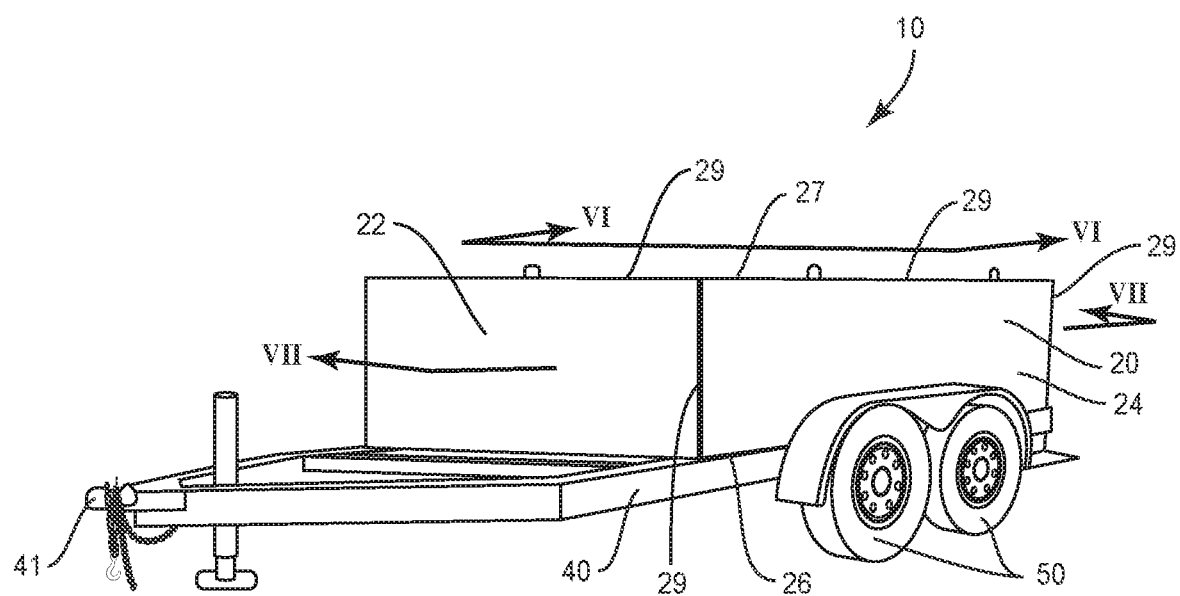
FIG. 3 is a perspective view of a trailer.
Figure 4:
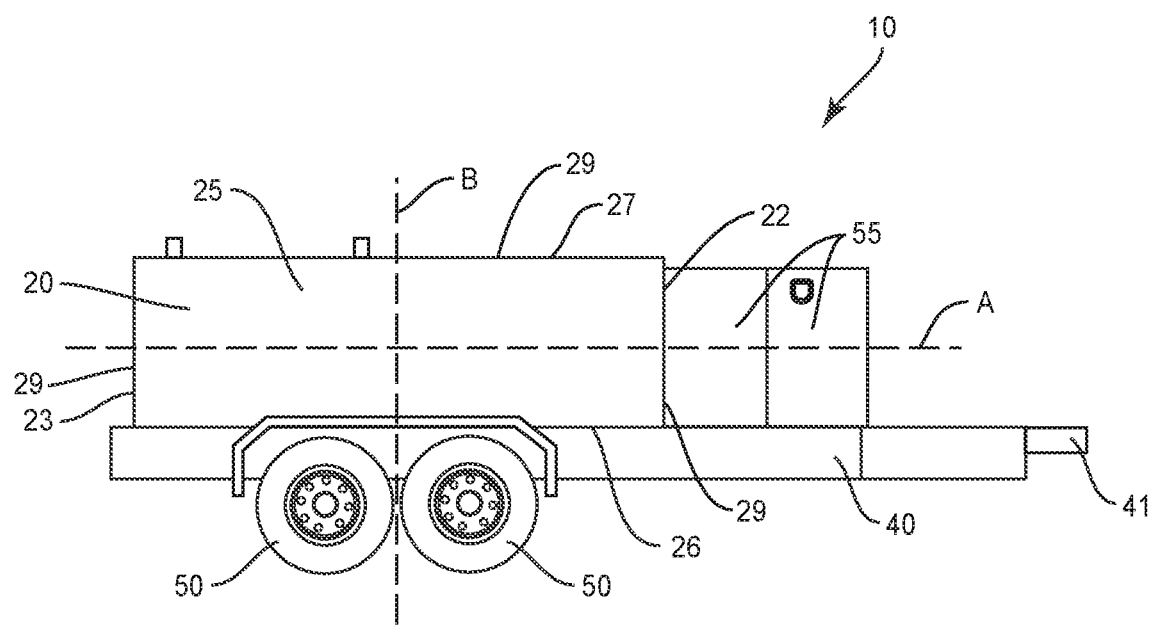
FIG. 4 is a perspective view of a trailer.
Figure 5:
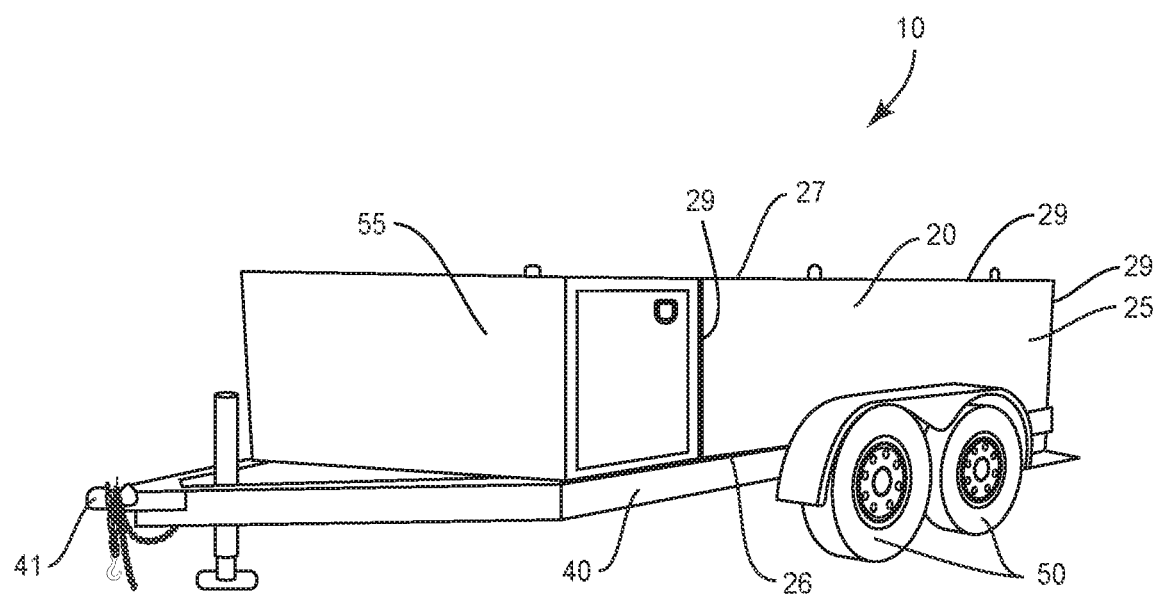
FIG. 5 is a perspective view of a trailer.

FIG. 3 illustrates a trailer 10 with a tank 20 sized to hold fluid. The tank 20 can include various capacities, with one specific tank sized to contain 900 gallons. Other tanks 20 can include larger or smaller capacities depending upon the context of use. The chassis 40 supports the tank 20 and includes wheels 50 to move the tank 20 to the desired geographic location to dispense fuel. The wheels 50 can be mounted to one or more axles that are mounted to the chassis 40. As illustrated in FIG. 3, a portion of the chassis 40 in front of the tank 20 (i.e., in front of the front side 22) can be exposed. As illustrated in FIGS. 4 and 5, one or more cabinets 55 can be positioned on the chassis 40. The cabinets 55 can contain various components, such as a pump, one or more filters, fuel lines, fuel gauge, hose, nozzle etc. to dispense the fluid from the tank 20. The cabinets 55 can include a door to provide access to the interior. The door can also include a lock to prevent access to the interior, such as to prevent an unauthorized person from dispensing fuel.

The chassis 40 can include a hitch 41 at one end to connect to a vehicle to pull the trailer 10 to the desired locations. The hitch 41 can include a receptacle to receive a ball on the vehicle. The hitch 41 can also include other configurations for connecting the trailer 10 to a vehicle. One design includes the chassis 40 with a hitch 41 at the front end to be attached to a pulling vehicle. The back end of the chassis 40 can include a ball to connect to another trailer 10, such as for a vehicle to tow multiple trailers 10 in a row.

The tank 20 includes six planar sides. The sides include opposing front and back sides 22, 23, opposing lateral sides 24, 25, and opposing bottom and top sides 26, 27. As illustrated in FIG. 4, a first axis A is perpendicular to the front and back sides 22, 23 and extends through the tank 20. A second axis B is perpendicular to the bottom and top sides 26, 27 and extends through the tank 20.

Figure 6:
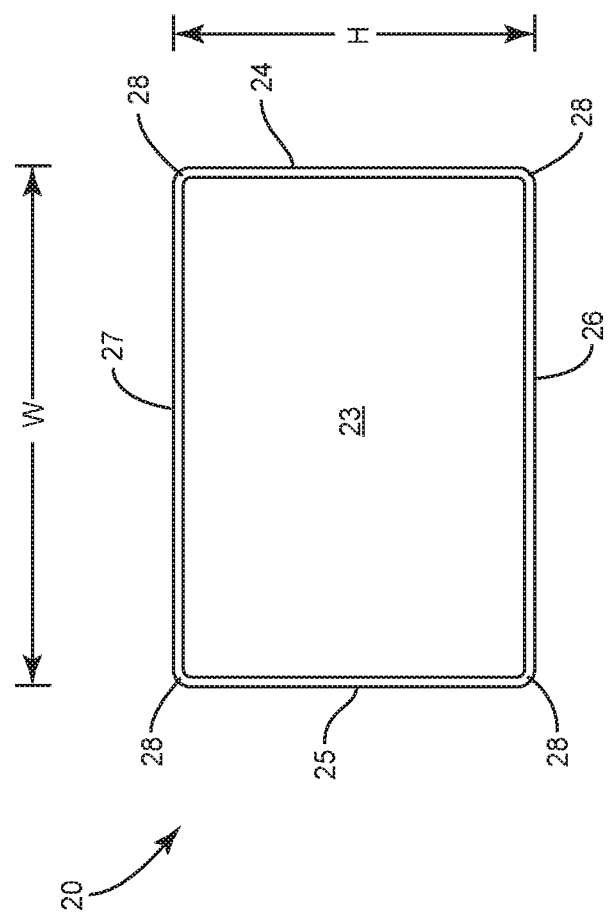
FIG. 6 is a schematic section view cut along line VI-VI of FIG. 3.

FIG. 6 illustrates a section view cut across the first axis A (line VI-VI) in FIG. 3. This cut is in a plane that is perpendicular to the first axis A. The tank 20 includes a rectangular sectional shape with rounded corners 28. The lateral sides 24, 25 are parallel to one another, and the bottom side 26 and top side 27 are also parallel. Each of the lateral sides 24, 25 is perpendicular to each of the bottom and top sides 26, 27. The corners 28 include a rounded shape due to the forming process as will be explained in detail below.

Elements can be attached to the tank 20. The elements can include but are not limited to pressure release ports, cabinets, and moving vehicle requirements such as lights, reflectors, blinkers.

As illustrated in FIG. 6, the tank 20 includes a width W measured between the lateral sides 24, 25, and a height H measured between the bottom and top sides 26, 27. In this design, the width W is greater than the height H. Other designs can include the height H being smaller than the width W, and the height H being equal to the width W. The rectangular shape provides for an aerodynamic shape when the trailer 10 is being moved.

One specific design includes a tank 20 with a height H of thirty-eight (38) inches, a width W of sixty (60) inches, and a length L of one hundred and fourteen (114) inches.

The rectangular cross-sectional shape can include an outer shape of the tank 20 or an inner shape of the tank 20 that forms the interior space 21.

The entire interior space 21 can be used to store fluid. Alternatively or additionally, one or more sections of the interior space 21 can be used to store equipment and/or components for moving, distributing, and/or receiving the fuel. One design includes a sump in tank 20.

Figure 7:
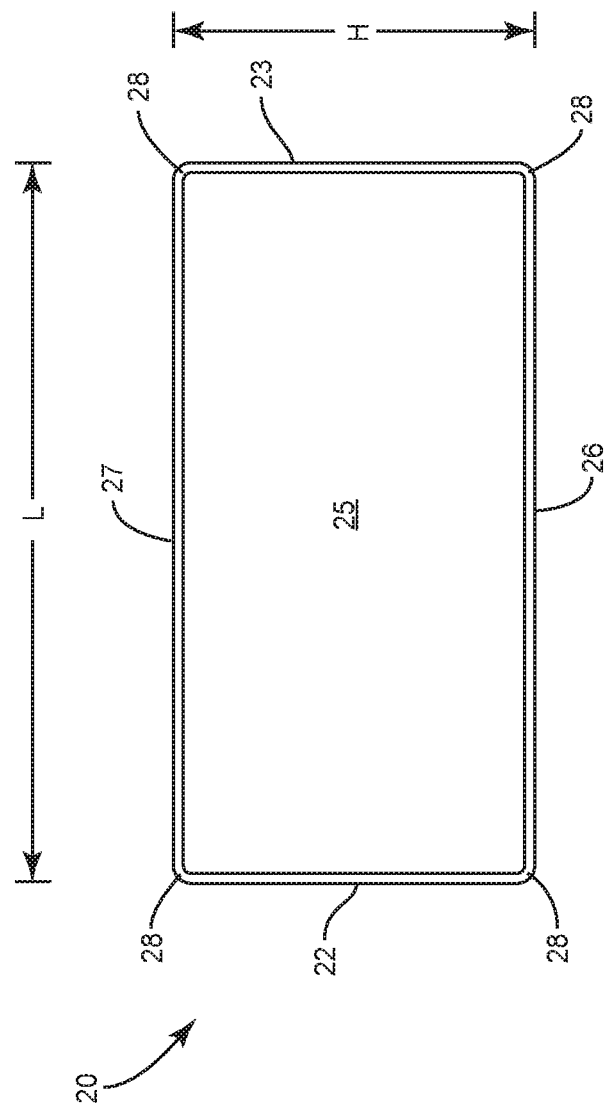
FIG. 7 is a schematic section view cut along line VII-VII of FIG. 3.

FIG. 7 is a section view of a length of the tank 20 that cuts across the front side 22 and the back side 23. The tank 20 in this direction also includes a rectangular sectional shape with rounded corners. The front and back sides 22, 23 are parallel, and the bottom and top sides 26, 27 are parallel. Further, each of the front and back sides 22, 23 are perpendicular to each of the bottom side 26 and top side 27. The corners 28 are rounded. The length L measured between the front and back sides 22, 23 is greater than the height H measured between the bottom 26 and top 27. Other designs can include the height H being smaller than the length L, and the height H and length L being equal.

Figure 8:
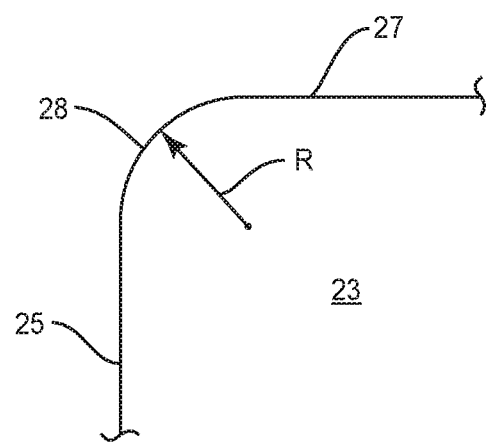
FIG. 8 is a schematic view of a rounded corner of a tank.

As illustrated in FIG. 8, the corners 28 are rounded and include a radius R. The tank 20 includes eight corners 28 that can each include the rounded shape. FIG. 8 illustrates one of the corners 28 formed between sides 23, 25, 27. The rounded corners 28 prevent and/or eliminate stress risers that can be isolated on the tank 20 due to the forces applied by the fluid within the interior space 21. The radius R of each corner 28 can be the same or one or more of the corners 28 can include different radii. Edges 29 of the tank 20 that extend between the corners 28 are also rounded.

The tank 20 can be constructed from aluminum. This provides for a smaller weight than if the tank were made from other metals such as steel. One design includes the tank 20 constructed from ¼" aluminum. Other thicknesses of aluminum can also be used, such as but not limited to ⅜", ½", and ⅝". One specific material is 5083 aluminum alloy. The tank 20 can also be constructed from other materials, such as but not limited to steel. These tanks 20 can be constructed with from materials having various thicknesses, such as within a range of ¼" to ⅝".

The tank 20 can contain a variety of different fluids, including but not limited to fuel, liquid fertilizer, and water.

One or more baffles 60 are positioned in the interior space 21 to restrain the flow of the fluid. The baffles 60 lessen the dynamic load that the fluid exerts on the tank 20 as it moves within the interior space 21 due to movement of the tank 20. The baffles 60 allow for the tank 20 to be constructed with lighter materials and still provide for secure containment of the fluid. One or more baffles 60 positioned along the length L of the tank 20 particularly lessen the dynamic load placed on the front and back sides 22, 23 during movement of the tank 20 in a forward and reverse direction indicated by arrow Y in FIG. 9. In one design, the baffles 60 in combination with the rounded corners 28 reduce/eliminate stress risers to provide for the tank 20 to maintain its integrity to move and store fluid for an extended period of use (e.g., years).

Figure 9:
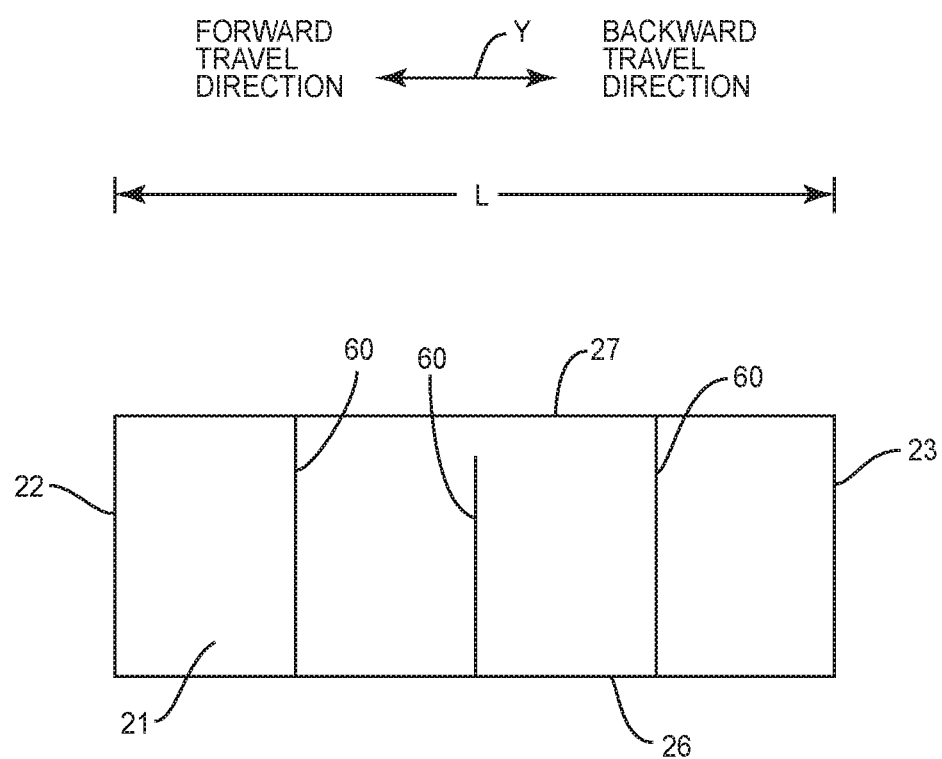
FIG. 9 is a schematic side view of a tank with baffles.

FIG. 9 illustrates baffles 60 spaced across the length L between the front side 22 and the back side 23. The number and arrangement of baffles 61 within the interior space 21 can vary. The baffles 61 can extend completely or partially across the interior space 21 between the opposing sides 22, 23, 24, 25, 26, 27. In multi-baffle designs, the different baffles 60 can include the same or different shapes and/or sizes.

Figure 10A:
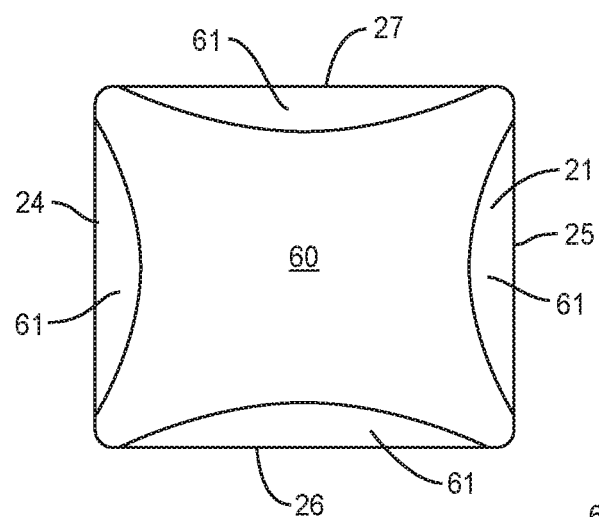
FIG. 10A is a schematic end view of a baffle positioned within a tank.
Figure 10B:
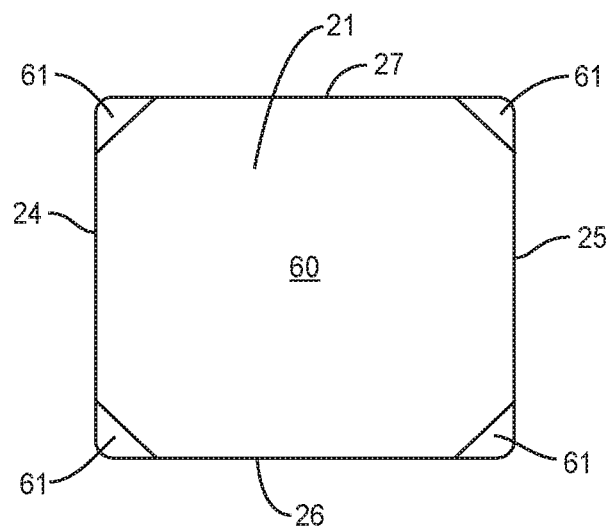
FIG. 10B is a schematic end view of a baffle positioned within a tank.

The baffles 60 can include a variety of shapes and sizes. FIG. 10A includes a baffle 60 shaped with a number of openings 61 located for the passage of fluid. The baffle 60 is sized to contact against and be secured to the opposing lateral sides 24, 25, and the opposing bottom and top sides 26, 27. FIG. 10B includes a baffle 60 with openings 61 located in each of the corners of the interior space 21.

Figure 11:
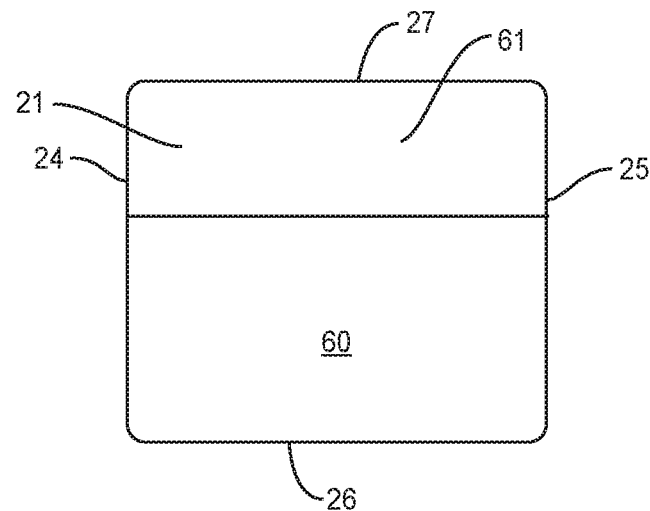
FIG. 11 is a schematic end view of a baffle positioned within a tank.

FIG. 11 includes a baffle 60 that extends between the opposing lateral sides 24, 25. The baffle 60 has a limited height such that an opening 61 is formed along the upper reaches of the interior space 21 between the baffle 60 and the top side 27.

Figure 12:
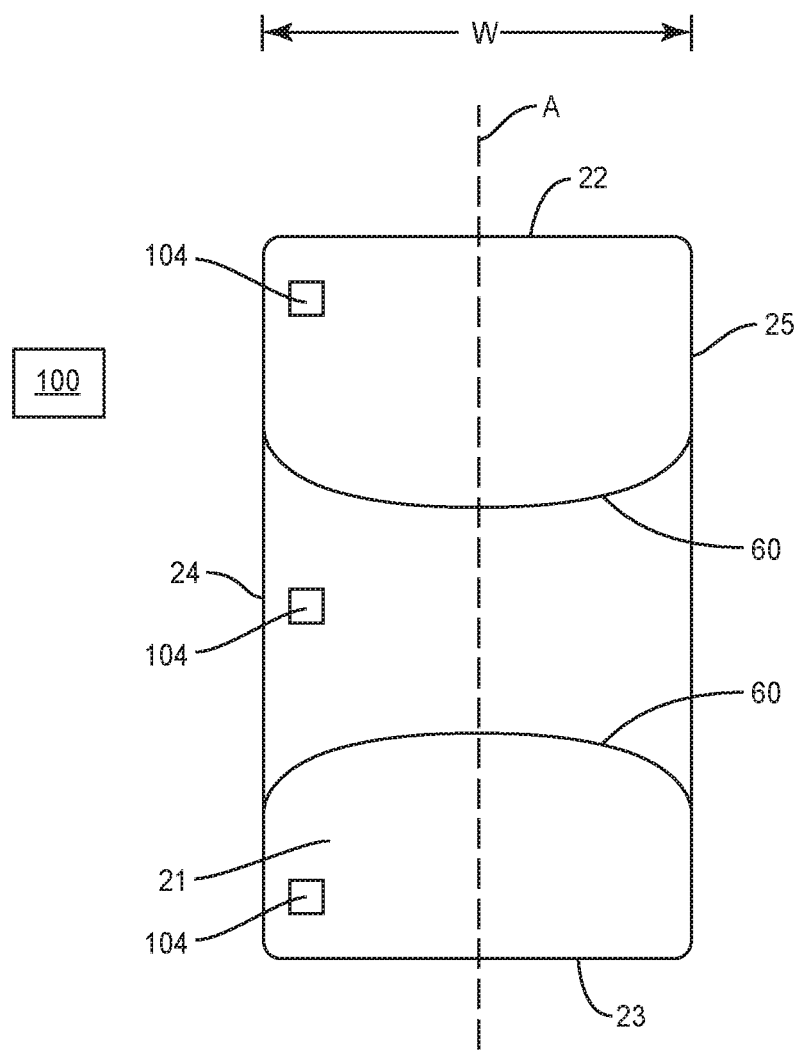
FIG. 12 is a schematic plan view of baffles positioned within a tank.

FIG. 12 illustrates a top view of baffles 60 positioned within the interior space 21. The baffles 60 include a curved shape along the axis A that extends between the front and back sides 22, 23. In one design, the baffles 60 include a greater width W than the interior space 21. The baffles 60 are stressed such as being bent (e.g., bowed across the width W of the interior space 21) and inserted into the interior space 21. The outer edges of the baffles 60 can be attached to one or more of the interior sides of the tank 20 to maintain the stressed shape.

The baffles 60 can be constructed from various materials. Materials include aluminum, steel, and various metals.

The baffles 60 can be secured in the interior space 21 in various manners. One includes the baffles 60 being welded to or more of the interior sides of the tank 20. The baffles 60 can also be secured to the tank 20 by mechanical fasteners such as bolts, screws, and rivets.

The baffles 60 can be positioned away from the rounded corners 28. This facilitates construction of the tank 20 as will be disclosed below.

Figure 13:
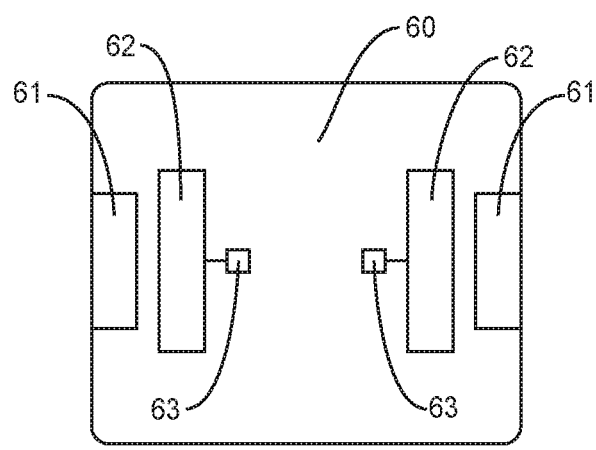
FIG. 13 is a schematic view of a baffle with openings and gates positioned at the openings.

One or more of the baffles 60 can also function as a shut-off to isolate different sections of the interior space 21. As illustrated in FIG. 13, gates 62 can be positioned adjacent to the openings 61. The gates 62 can be positioned in an open position away from the openings 61 as illustrated in FIG. 13. To close the baffle 60 to prevent fluid movement through the baffle 60, the gates 62 can be moved by actuators 63 to a closed position across the openings 61 to prevent the movement of fluid through the baffle 60. The actuators 63 provide for moving the gates 62 across the openings 61. Various actuators 63 can be used, including a biasing member with an engagement switch and a solenoid.

Figure 14:
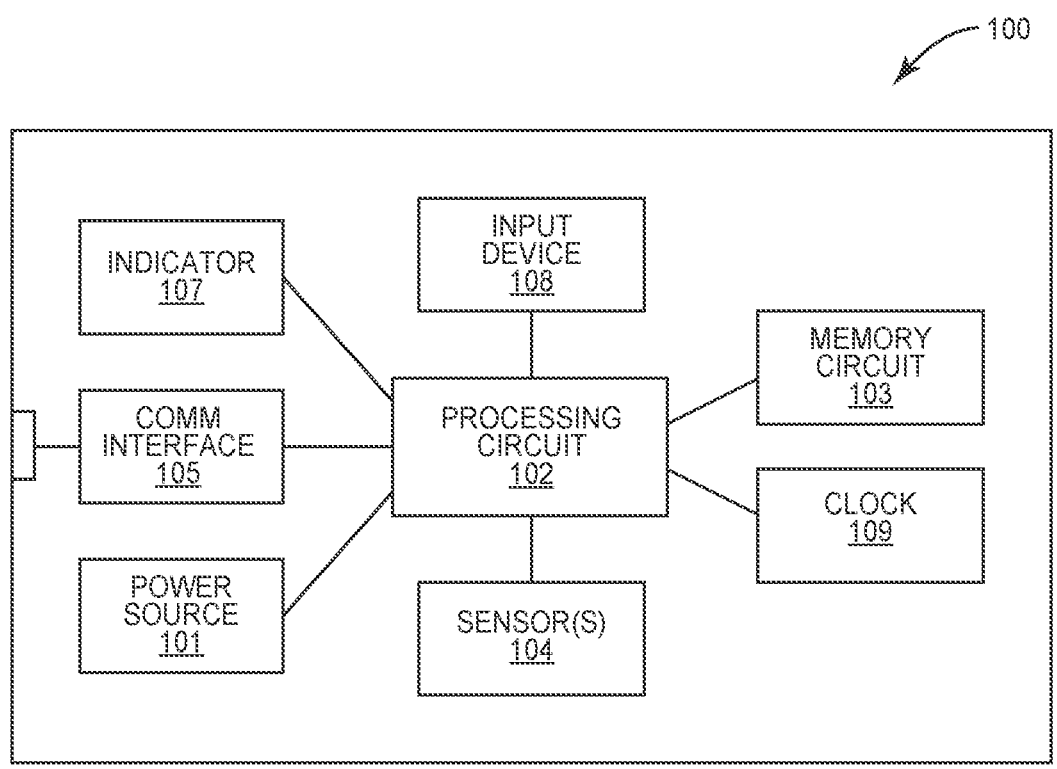
FIG. 14 is a schematic view of a control system.

As illustrated in FIG. 14, a control system 100 can control the operation of the gates 62. The control system 100 includes a processing circuit 102 that is communicatively coupled to one or more other components including the actuators 63 of the trailer 10, e.g., via one or more buses. The processing circuit 102 can include one or more general-purpose and/or dedicated processors, including (but not limited to) one or more microprocessors, microcontrollers, application-specific integrated circuits (ASICs), field-programmable gate arrays (FPGAs), digital signal processors (DSPs), and/or other circuitry configured with appropriate software and/or firmware to control the movement of the fuel through the trailer 10 according to program instructions stored in a memory circuit 103. The memory circuit 103 stores processing logic, programming code, and operational information for use by the processing circuit 102. The memory circuit 103 can include volatile memory, non-volatile memory, or both, according to various embodiments. One or more sensors 104 are positioned on the trailer 10, including the interior space 21 and are configured to determine aspects about the fuel and/or the fuel system.

A communication interface 105 is configured to exchange signals with one or more remote sources. For example, the communication interface 105 can comprise an electronic transmitter for transmitting radio, electrical, and/or optical signals, and can further comprise an electronic receiver for receiving radio, electrical, and/or optical signals. In some embodiments, the communication interface 105 is configured to support short-range wireless signaling via BLUETOOTH, RFID, ZIGBEE, and/or WIFI. The communication interface 105 can additionally or alternatively be configured to support long-range wireless communication via cellular- and/or satellite-based signaling. The communication interface 105 can additionally or alternatively be configured to support signaling over a wired connection, such as a serial, USB, micro USB, FIREWIRE, Lightning, and/or Thunderbolt connection. There can be more than one communications interface 105. In such embodiments that support radio communication, an antenna (not illustrated) can be configured for the transmitting and receiving of wireless signals to and from the remote sources.

A clock 109 is configured to measure various timing aspects of the fuel in the fuel system 11. The control system 100 can further include one or more indicators 107, such as light-emitting diodes (LEDs) or LCD displays, for indicating various data items to a user. For example, the indicator 107 could be used to indicate the amount of fuel within the tank 10, the amount of time since the last re-polishing event, etc. An input device 108 such as a keypad, touchpad, switch, dial, buttons, track-ball, etc. can be included to receive inputs from an operator. The control system 100 can include a separate power source 101 such as a battery (not illustrated) for powering one or more of the components. The control system 100 can additionally or alternatively receive power from an external source. In one design, the trailer 10 is equipped with solar power capability that includes one or more solar panels that convert light energy. The power can be harnessed and used to operate one or more components of the control system 100 and/or the trailer 10.

As illustrated in FIG. 12, the sensors 104 can be positioned at various locations throughout the trailer 10. The sensors 104 can detect various aspects of the fuel and/or fuel system as well as environmental conditions, including but not limited to the flow rate, amount of fuel in the interior space 21, amount of fuel within each section of the tank that are separated by baffles 60, pressure in the interior space 21, pressure in the separate section, temperature of the fuel, temperature within the interior space 21, humidity at the trailer 10, humidity in the interior space 21, etc. Signals from the sensors 104 are received by the processing circuit 102 that calculates the various values.

The processing circuit 102 can activate one or more of the actuators 63 to close one or more of the gates 62. This can occur in the event a leak is detected in the tank 20. A leak can be detected in various manners, including the sensed fuel level being below a calculated amounted, and the fuel amount within the interior space 21 or one or more of the interior sections changing over a period of time.

The processing circuit 102 can also close one or more of the gates 62 at various times. This can include closing during movement of the trailer 10 that is detected by a motion sensor 104 or a signal received from the vehicle that is pulling the trailer 10. This can also include when a fluid flow rate is above a predetermined amount. This predetermined amount could potentially exert a large force on the tank 20 and thus closing one or more of the gates 62 can reduce the force.

Figure 15:
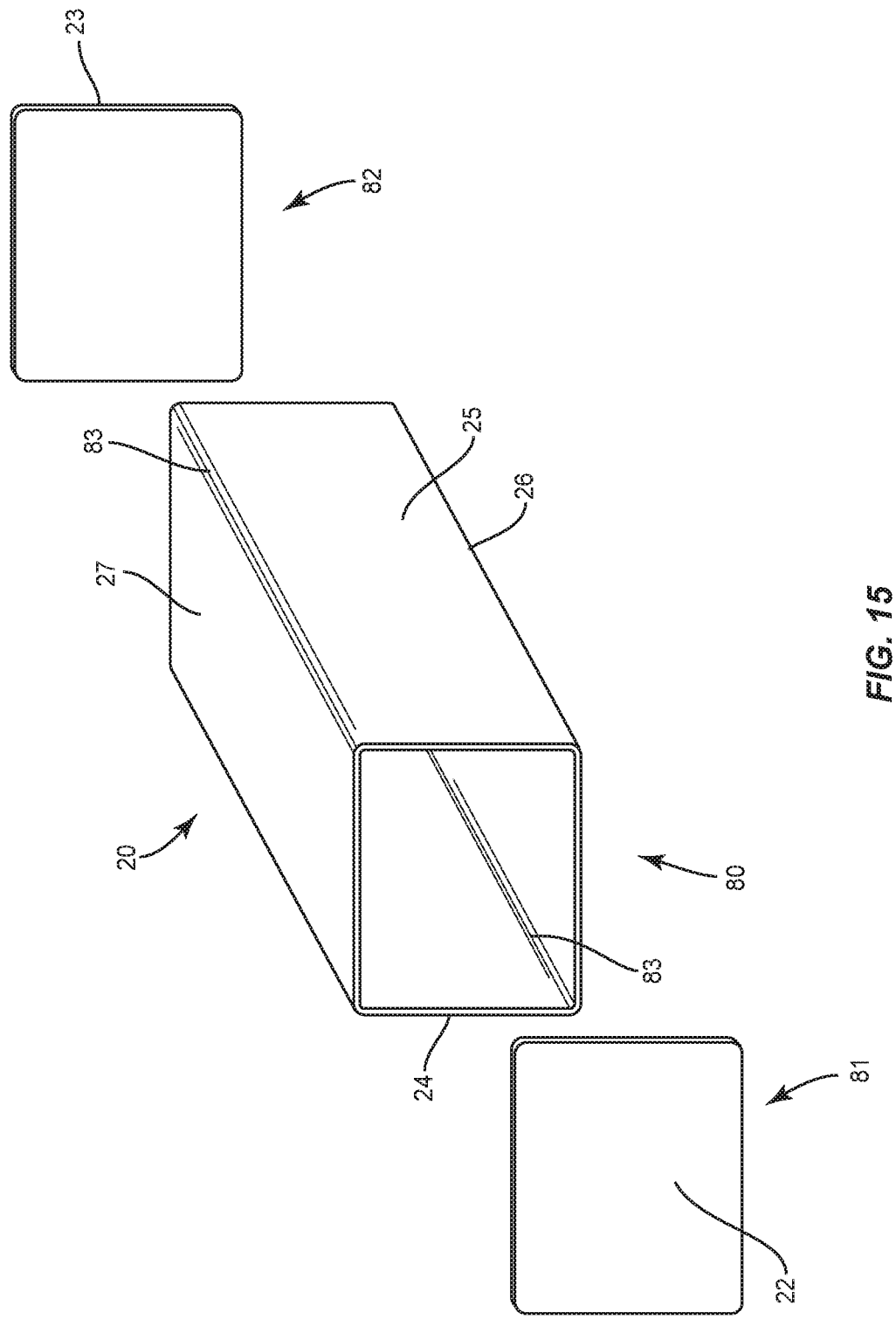
FIG. 15 is an exploded perspective view of a tank.

As illustrated in FIG. 15, the tank 20 can be constructed from multiple different sections. A middle section 80 forms the interior portion of the tank 20. A first end section 81 is sized and shaped to be attached to one end of the middle section 80. A second end section 82 is sized and shaped to be attached to the other end of the middle section 80.

Figure 16:
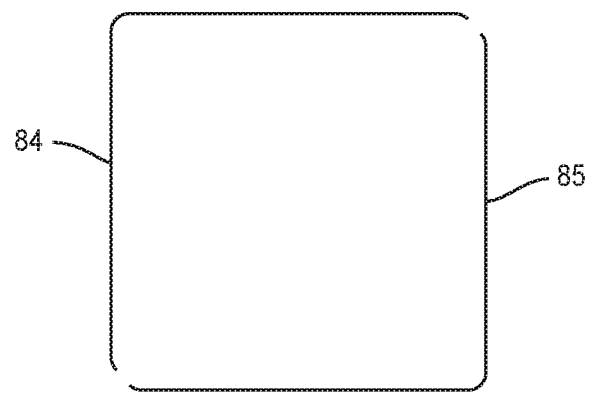
FIG. 16 is a schematic end view of a middle section of a tank constructed from first and second sheets.

The middle section 80 can be constructed from a single sheet that is formed into the rectangular sectional shape with the rounded corners 28. The middle section 80 can also be constructed from two separate sheets as illustrated in FIG. 16. First and second sheets 84, 85 are each formed into separate sections of the middle section 80. This includes forming a bend in the sheets 84, 85 between the exposed ends and that extends the lengths of the sheets 84, 85. The first and second sheets 84, 85 can be connected together by welding the exposed ends and forming longitudinal seams 83 (see FIG. 15) that extend the length L. The end sections 81, 82 can then be welded onto the open ends of the middle section 80.

Figure 17:
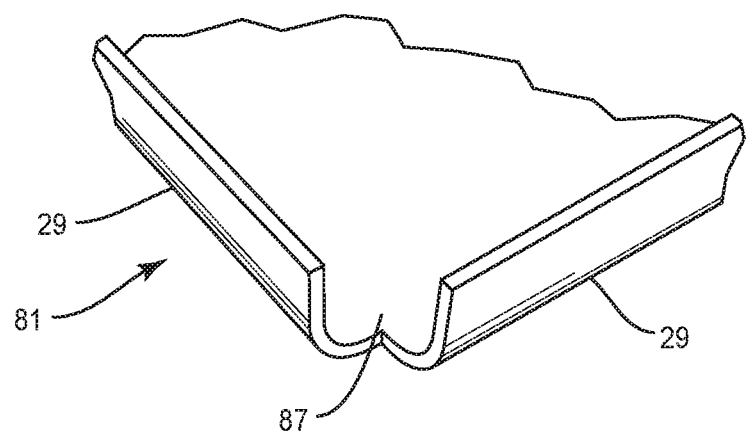
FIG. 17 is a perspective view of a cut-out corner of a sheet for use as a side of a tank.
Figure 18:
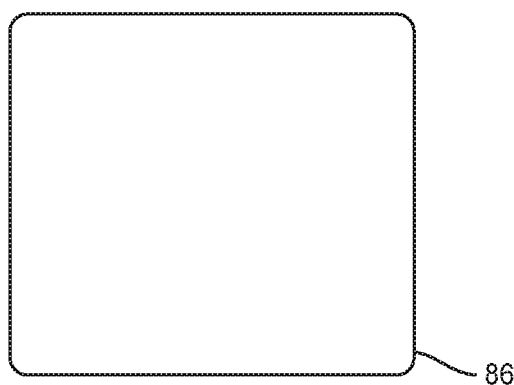
FIG. 18 is a schematic view of a cap attached to a corner of a tank.

As illustrated in FIG. 17, the corners of one or more of the sections 80, 81, 82 can be removed. The cut-outs 87 are positioned in the corners of the tank 20 during assembly. A concave cap 86 as illustrated in FIG. 18 can be welded into the cut-out corners 87 providing the rounded edges to carry through and be continuous throughout the tank 20.

Figure 19:
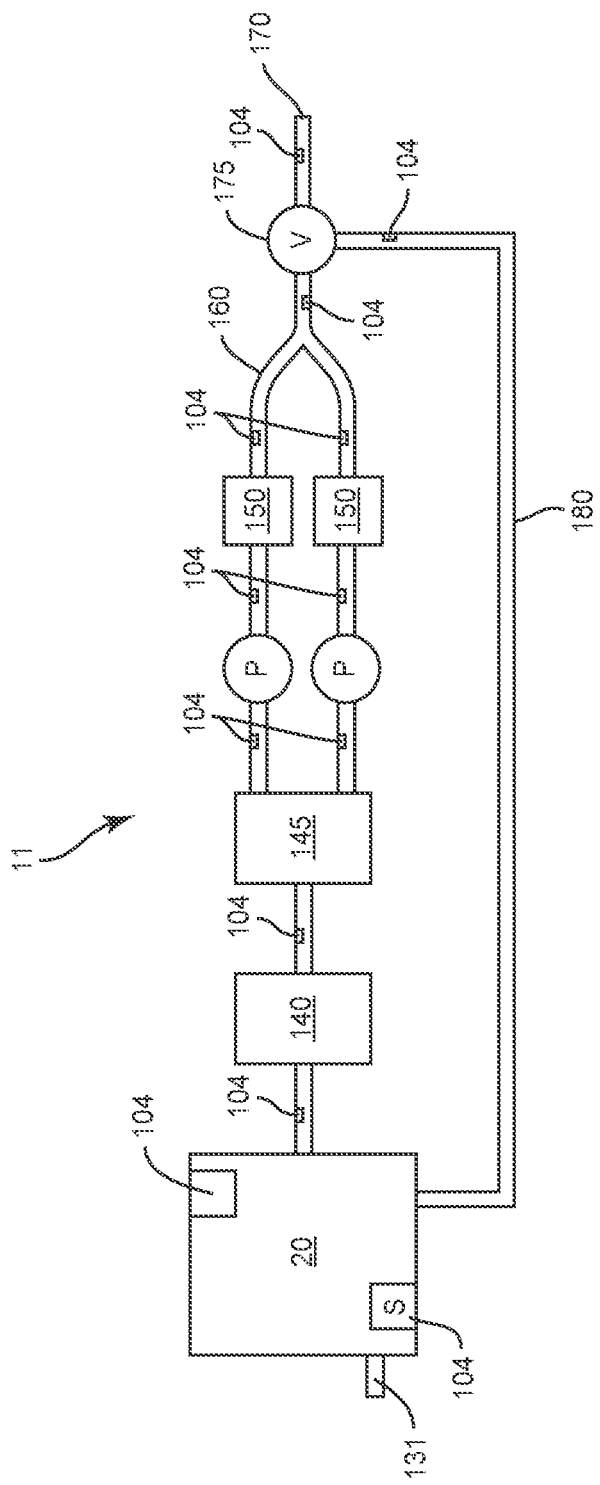
FIG. 19 is a schematic diagram of a fuel system within a fuel trailer.
Figure 20:
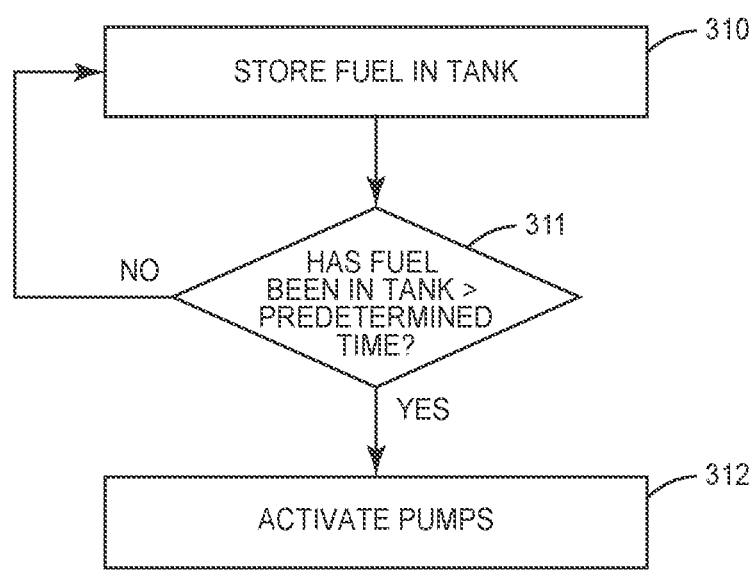
FIG. 20 is a flowchart diagram of a method of dispensing fuel from the trailer.

The trailer 10 can be used to transport and store a variety of different fluids, including but not limited to fuel, water, and fertilizer. One application of use is for the trailer 10 to be used to transport and store fuel. In this application, the trailer 10 includes a fuel system 11 to filter and/or dispense the fuel. Components of the fuel system 11 can be positioned within one or more of the cabinets 55 and tank 20. Additionally or alternatively, the components can be mounted to the tank 20 and/or the chassis 40. FIG. 19 illustrates schematically the fuel components of a fuel system 11 of the trailer 10. An outlet 131 can extend from the tank 20 to remove contaminants in the fuel. The outlet 131 can be positioned at various locations on the tank 20, including at a lower section of the tank (as illustrated in FIG. 19) and at a higher section of the tank. Further, multiple outlets 131 can extend from the tank 20. In one use, the outlet 131 can be used to remove water that has accumulated in the fuel.

Another outlet from the tank 20 feeds the fuel into a first filter 140. This filter 140 removes a first amount of contaminants in the fuel. In one aspect, the filter 140 is an 80-micron particulate filter. The filter 140 can remove various contaminants, including but not limited to scale, mud, and debris.

Fuel from the filter 140 is then fed into a second filter 145. The second filter 145 removes a second amount and/or a second type of contaminants from the fuel. In one aspect, the second filter 145 is an organic filter. The second filter 145 can be configured to remove contaminants including but not limited to bacteria and mold.

One or more pumps P are positioned to move the fuel through the fuel system 11. The pumps P can be configured to provide a fuel flow rate as needed to move the fuel through the fuel system 11. The pumps P can be the same or different, and can provide for the same or different flow rates.

Filters 150 are configured to remove additional contaminants from the fuel that were not previously removed. In one aspect, the filters 150 are separating filters that separate water from the fuel. The filters 150 can include a coalescing filter element that removes the water from the fuel. The filters 150 can also be water absorbing filters that absorb the water in the fuel.

Fuel from the filters 150 moves through a Y-connector 160 and includes a single outlet that forms a single stream. The fuel can then be output through a dispensing end 170 equipped with a hose and nozzle. The fuel can also be directed by a valve 175 through a line 180 and back into the tank 20.

One or more sections of the fuel system 11 can include redundant components. In the event a section of the system 11 fails, fuel can still be processed through the remaining section. FIG. 19 includes the redundancy beginning downstream from the filter 145. A first line receives fuel and moves the fuel through a pump P and filter 150. A second line also receives fuel from the filter 145 and includes a pump P and filter 150. In the event that one of the components (e.g., a pump P or a filter 150) fails, the line can be shut down and processing of fuel can continue on the remaining line. The lines can include one or more valves that can be shut to prevent the flow of fuel thus shutting down the line. The applicable pump P can be stopped to stop the flow of fuel through the failed line.

The control system 100 as schematically illustrated in FIG. 14 oversees the movement of fuel through the fuel system 11.

The sensors 104 can be positioned at various locations throughout the fuel system 11. The sensors 104 can detect various aspects of the fuel and/or fuel system 11, including but not limited to the flow rate, amount of fuel in the tank 20, status of one or more of the filters 140, 145, 150, and contaminants in the fuel. Signals from the sensors 104 are received by the processing circuit 102 that calculates the various values. One or more of the sensors 104 can also detect environmental conditions of the environment and/or the fuel. This can be used by the processing circuit 102 to determine fuel status. Detected aspects include but are not limited to the temperature at the trailer 10, the temperature within the fuel tank 20, the temperature of the fuel at one or more locations along the fuel system 11, and the humidity at the trailer 10.

The processing circuit 102 can polish the fuel in the event the fuel has been stored within the tank 20 for an extended period of time. For example, this can occur when the trailer 10 is positioned at a remote location such as a remote outpost in which the demand for fuel is low. Another example is when the trailer 10 is filled with fuel and positioned in preparation for an event (but not yet in use), such as for emergency management scheduling. One specific example is a trailer 10 that stores fuel and is positioned in the field in anticipation of a possible hurricane strike. Another example is a trailer 10 with fuel that is housed at a relatively remote airport that does not see regular air traffic.

The trailer 10 can be configured to periodically move the fuel through the fuel system 11. This maintains the fuel in a usable state for when it is needed by a vehicle. The trailer 10 can move the fuel on a regular basis (e.g., every day, every week), after the fuel temperature has been elevated above a predetermined threshold, as well as immediately before a fueling event.

Figure 21:
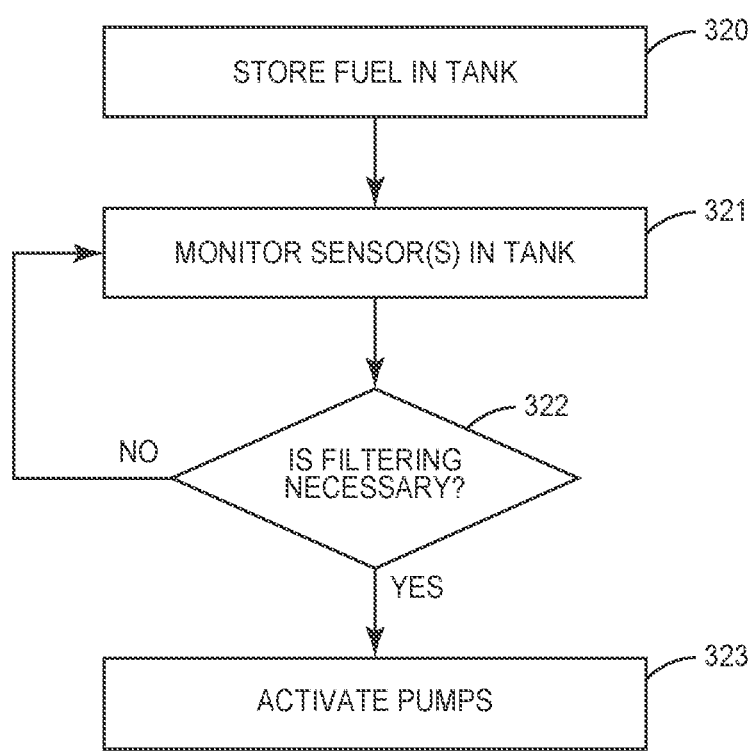
FIG. 21 is a flowchart diagram of a method of dispensing fuel from the trailer.

FIG. 21 illustrates a method of moving fuel through the fuel system 11. Initially, the fuel is stored in the tank 20 (block 310). The processing circuit 102 monitors the length of time that the fuel has been in the tank 20 and determines whether it exceeds a predetermined threshold (block 311). The threshold can vary depending upon different factors. In one embodiment, the threshold becomes smaller relative to the amount of time that the fuel has been stored in the tank 20 (i.e., a longer threshold when the fuel is originally stored in the tank 20, and a smaller threshold after the fuel has been in the tank 20 for a period of time). The time can also depend upon environmental conditions. For example, elevated temperatures at the trailer 10 and/or of the fuel can result in more frequent fuel movement through the fuel system 11. When the processing circuit 102 determines the length of time exceeds the threshold, the processing circuit 102 activates the pumps P and moves the fuel through the fuel system 11. The valve 175 downstream from the filters is positioned such that the fuel that has been moved and filtered through the system 11 is returned via the return line 180 to the tank 20. One or more sensors 104 along the fuel system 11 detect the amount of fuel and/or flow rate of the fuel moving through the fuel system 11. The processing circuit 102 receives the signals and determines how long to move the fuel through the fuel system 1. Moving the fuel through the fuel system 11 removes impurities from the fuel and maintains the fuel in a useful condition such that the fuel is ready to be dispensed when necessary. The processing circuit 102 can be configured to periodically move a predetermined amount of fuel through the fueling system 11. The processing circuit 102 can also be configured to move the fuel through the fuel system 11 until one or more sensor readings indicate that the fuel is in a predetermined condition.

FIG. 21 illustrates another method of moving fuel through the fuel system 11. The fuel is initially stored in the tank 20 (block 320). One or more sensors 104 in the tank 20 detect the condition of the fuel (block 321). This can include detecting a variety of different aspects, including but not limited to water and/or other debris in the fuel, and the temperature of the fuel. Monitoring of the fuel can be continuously performed, or can be performed on an intermittent basis. When the processing circuit 102 determines that one or more of the monitored aspects indicate that the fuel requires filtering (block 322), the processing circuit 102 activates the pumps P and moves the fuel through the fuel system 11 (block 323). This determination can include but is not limited the fuel having more than a predetermined amount of contaminants and the fuel temperature being above a predetermined threshold. After moving through the fuel system 11, the fuel is directed at the valve 175 into the return line 180 and moved back into the tank 20.

One or more sensors 104 detect the amount of fuel that is moved through the fuel system 11. The processing circuit 102 receives the signals and determines whether to continue moving the fuel through the fuel system 11. This can include moving a predetermined amount of fuel through the fuel system 11, or sensor readings that indicate the fuel being in at or above a predetermined threshold.

Figure 22:
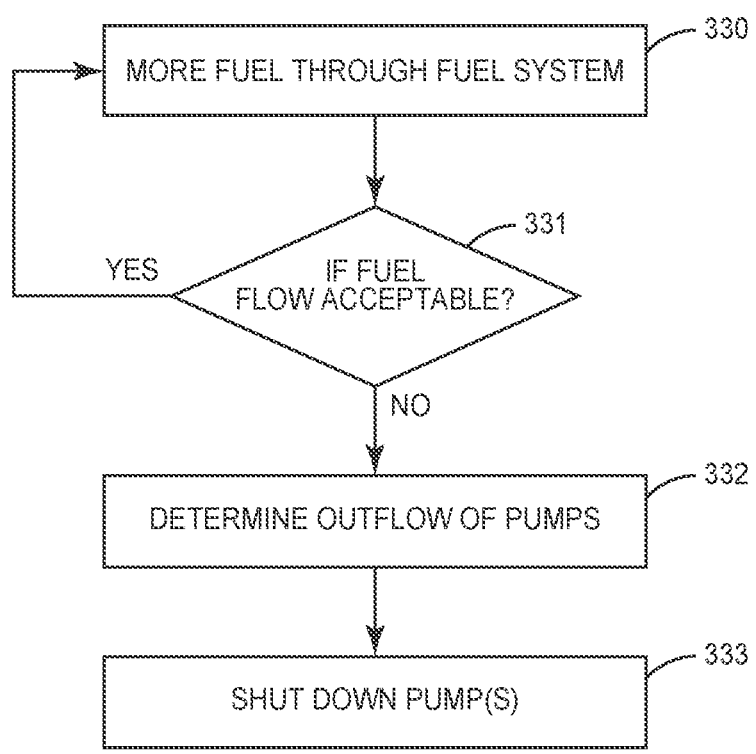
FIG. 22 is a flowchart diagram of a method of dispensing fuel from the trailer.

The processing circuit 102 controls the movement of the fuel. This can occur during dispensing of the fuel through the dispensing end 170 or returning the fuel to the tank 20 through the return line 180. FIG. 22 illustrates a method of moving the fuel through the fuel system 11. As the fuel is moved through the fuel system 11 (block 330), the processing circuit 102 receives signals from one or more of the sensors 104 within the fuel system 11. Based on these signals, the processing circuit 102 determines the fuel flow rate through the fuel system 11 (block 331). This can include the rate at one or more locations along the fuel system 11 and/or the rate at which fuel is being dispensed through the dispensing end 170. When the fuel flow is at or above a predetermined threshold, the fuel movement continues. When the fuel flow is not acceptable, the processing circuit 102 determines the outflow of the pumps P (block 332). This can include determining the movement of fuel upstream and downstream from the pumps P, the operational speed of the pumps P, or other manner to determine how effectively the pumps P are moving the fuel. The processing circuit 102 can adjust the speed of one or more of the pumps P to obtain the acceptable fuel flow rate. The processing circuit 102 can also shut down one or both pumps P (block 333). When one pump P is shut down, the fuel moving through the fuel system 11 is limited to the remaining operational fuel line(s). The processing circuit 102 can increase the speed of the one or more operational pumps P to increase the output through the fuel system 11.

Figure 23:
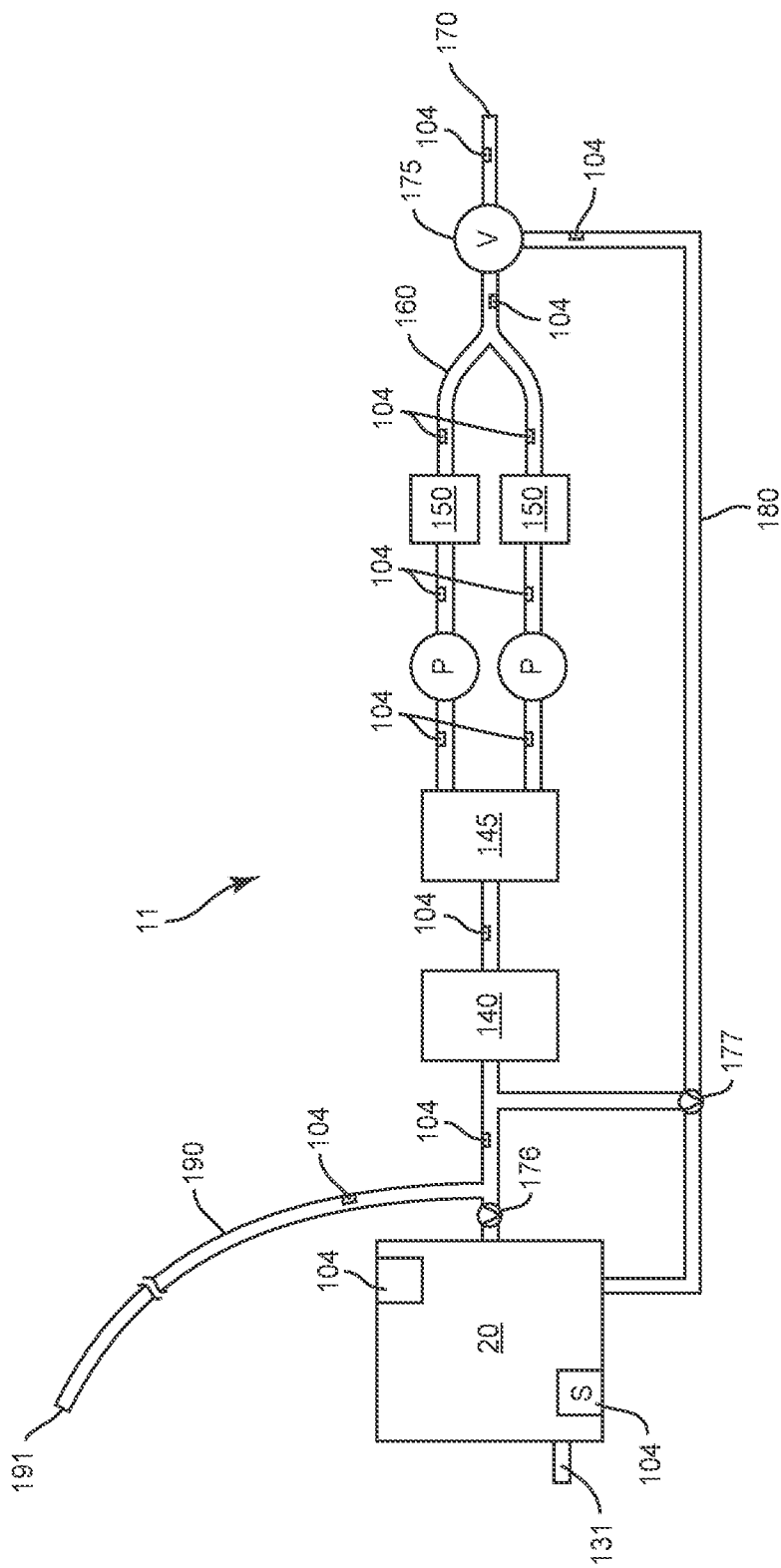
FIG. 23 is a schematic diagram of a fuel system that includes an input line to input fuel from a remote source.

The trailer 10 can also process fuel from other sources. FIG. 23 includes an input line 190 that is positioned downstream from the tank 20 and includes a distal end 191 that can be inserted or otherwise connected to a remote fuel source. Fuel from this source is pulled into the input line 190 and processed through the fuel system 11 as explained above. The trailer 10 can include a pump P along the input line 190 to pump the fuel from the remote source into the input line 190. The other pumps along the fuel system 11 can also be used to draw the fuel into fuel system 11. Further, one or more valves 176 are positioned between the input line 190 and the tank 20 to prevent fuel from directly entering into the tank 20 from the remote source prior to filtering. Further, the valve 175 downstream from the filters can be positioned to prevent the processed fuel from the remote source from being moved through the line 180 and into the tank 20.

The sensors 104 detect the fuel entered through the input line 190. This can include the amount of fuel entered into the fuel system 11 and/or contaminants that are in the fuel. Further, one or more sensors 104 can be positioned along the input line 190 to detect the fuel prior to entry into the fuel system 11. In one design, the processing circuit 102 receives the signals and determines the contaminants in this fuel. In the event the contaminants are above a threshold amount, the processing circuit 102 can stop the inputting and prevent additional fuel from being input into the fuel system 11. This can include shutting off the one or more pumps P.

In one design, the processing circuit 102 can determine that additional filtering is required of the fuel that is being input through the line 190. This can be based on readings from one or more sensors 104 positioned downstream from the input line 190. The fuel can be diverted at the valve 175 at the downstream end of the fuel system 11 and into the return line 180. Valve 177 located along the return line 180 can direct the fuel through the fuel system 11 downstream from the tank 20 for additional filtering. This further prevents the fuel that needs additional processing from being input into the fuel tank 20 and potentially contaminating the stored fuel.

The processing circuit 102 is configured to communicate with vehicles in need of fuel. This can include communications with incoming vehicles, such aircraft in the area in need of fuel or an approaching ground vehicle. When necessary, the processing circuit 102 can begin necessary prep work for the fuel to be ready for dispensing while the vehicle is approaching. The fuel is then ready for dispensing once the vehicle arrives at the trailer 10.

Figure 24:
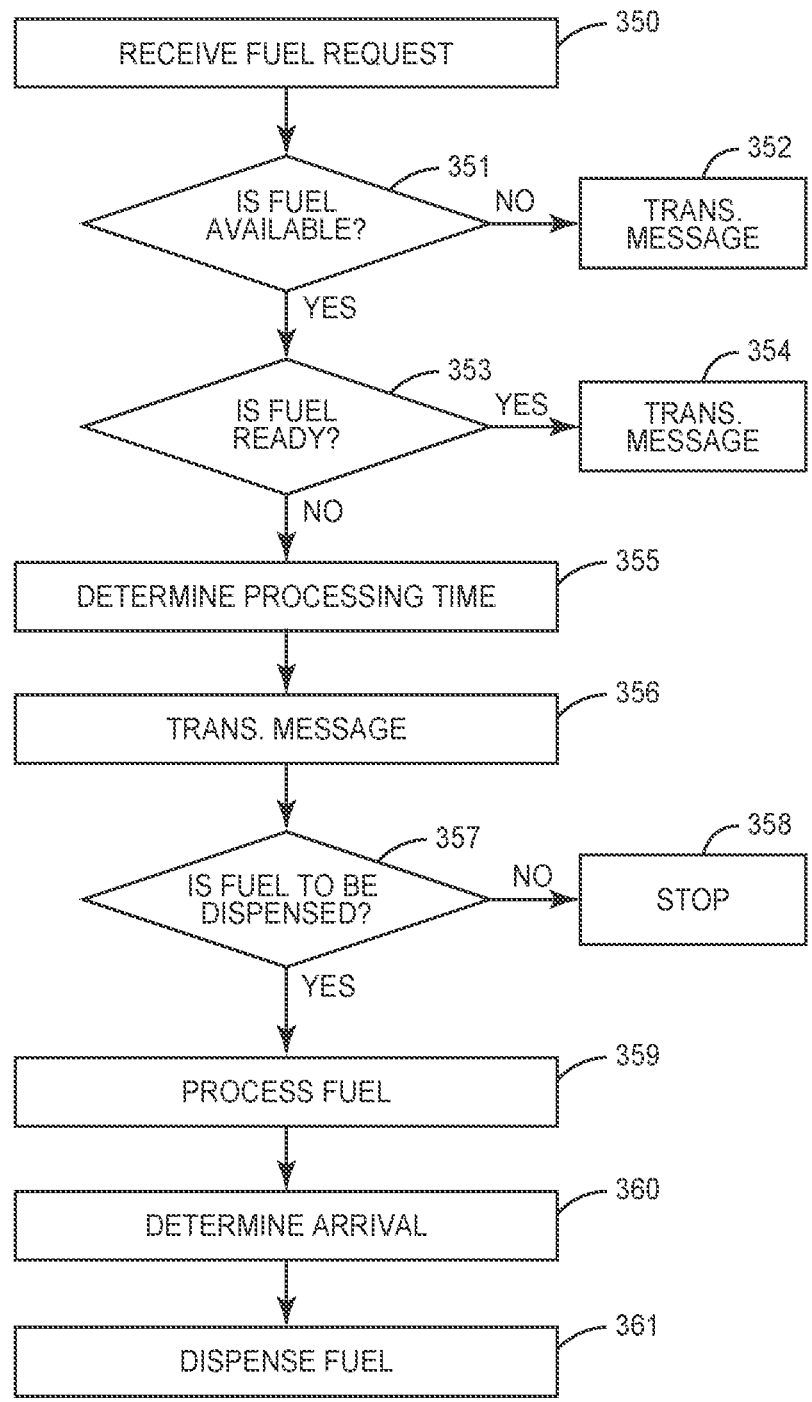
FIG. 24 is a flowchart diagram of a method of dispensing fuel from the trailer.

FIG. 24 illustrates steps performed by the processing circuit 102 upon receiving a request for fuel (block 350). The request includes the amount of fuel and the time when the fuel is needed by the vehicle. For example, an incoming vehicle can request the fuel for a future time, such as for a day in the future. Alternatively, the vehicle can request fuel based on the amount of time it will take the vehicle to travel to the trailer 10 (e.g., the vehicle is in the air and is ten minutes away from the trailer 10). The processing circuit 102 determines whether the requested amount of fuel is available (block 351). If the fuel is not available, a response is transmitted to the vehicle indicating that the fuel is not available (block 352). If the fuel is available, the processing circuit 102 determines whether the fuel is ready for dispensing (block 353). This can include if the fuel has not been moved through the fuel system 11 within a predetermined amount of time and/or a sensor reading. If the fuel is ready, a response is transmitted to the vehicle (block 354).

If the fuel is not ready for dispensing, the processing circuit 102 determines the amount of time necessary to prepare the fuel (block 355). This can include the amount of time necessary to move the fuel through the fuel system 11. The time when the fuel is available for dispensing is transmitted to the vehicle (block 356) who responds with confirmation that the fuel is needed or that the fuel is not needed (block 357). If the fuel is not needed, the trailer 10 stops (block 358). If the fuel is needed, the fuel is moved through the fuel system 11 (block 359). This can include moving the fuel through the fuel system 11 a predetermined number of times. This can also include processing the fuel until readings from one or more sensor 104 indicate that the fuel is in condition for dispensing.

The processing circuit 102 determines that the vehicle has arrived at the trailer 10 (block 360). This can include a person entering a passcode into the input device 208 of the control system 100, or activating the fuel system 11. The fuel is then dispensed through the dispensing end 170 (block 361).

The trailer 10 can be configured such that the fuel is maintained in a ready state. This includes the fuel being periodically moved through the fuel system 11. This movement can occur on a scheduled basis, such as every day, week, etc., or can occur when the processing circuit 102 determines this is necessary based on readings from one or more sensors 104. As the fuel is in a ready state, the processing circuit 102 can determine just whether the requested amount of fuel is available to a vehicle when a fuel request is received. It is not necessary for the processing circuit 102 to determine the state of the fuel.

Figure 25:
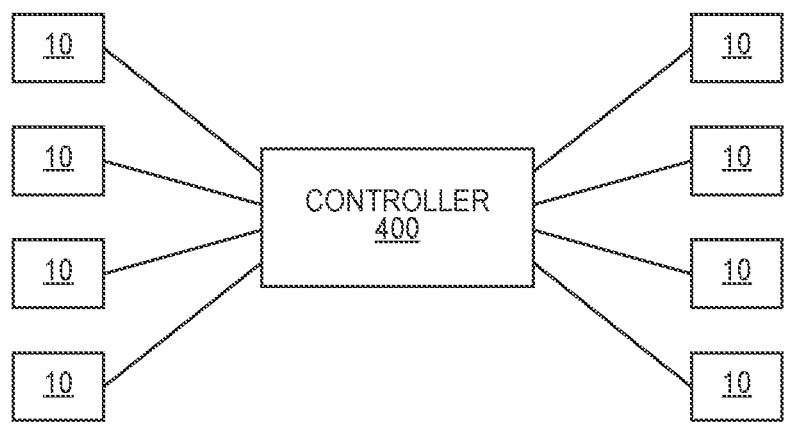
FIG. 25 is a schematic diagram of a fuel network that includes a controller and trailers.

The trailer 10 can be configured to receive fuel requests directly from vehicles. The trailer 10 can also be configured as part of a larger network of trailers 10 that extend over an enlarged area. A central controller 400 is configured to communicate with the trailer 10. The central controller 400 can simply monitor the trailer 10 or can schedule fuel activities of the trailer 10. FIG. 25 illustrates a network that includes the controller 400 that is in communication with multiple trailers 10, e.g., directly or via one or more routers, gateways, switches, hubs, firewalls, and/or signaling mediums (not shown) capable of supporting the communication. The trailers 10 can be spread out about an enlarged geographic area to facilitate fuel options that are available to vehicles.

Figure 26:
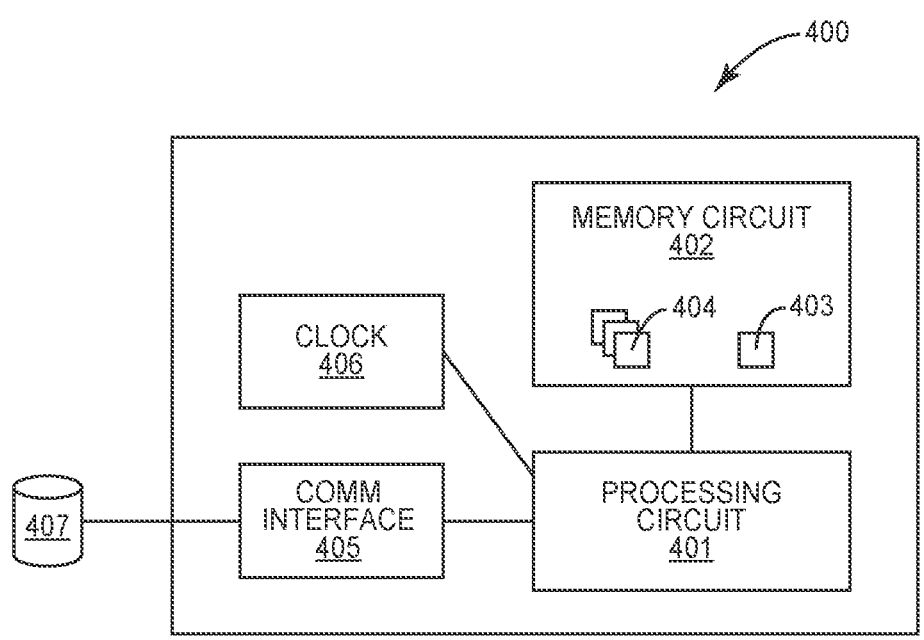
FIG. 26 is a schematic diagram of a control system of a controller.

FIG. 26 schematically illustrates a controller 400. The controller 400 includes one or more processing circuits 401 that can include one or more microprocessors, microcontrollers, Application Specific Integrated Circuits (ASICs), field-programmable gate arrays (FPGAs), digital signal processors (DSPs), and/or other circuitry configured with appropriate software and/or firmware to control the dispensing of fuel throughout the network of trailers 10. A computer readable storage medium (shown as memory circuit 402) stores data and computer readable program code that configures the processing circuit 401 to implement the various monitoring techniques. Memory circuit 402 is a non-transitory computer readable medium, and can include various memory devices such as random access memory, read-only memory, and flash memory. A control application 403 can be stored in the memory circuit 402 that, when run by the processing circuit 401, controls the operation of the controller 400. Vehicle profiles 404 can be stored in the memory circuit 402 and can include information about the vehicles, such as account information, historic information about previous fueling, maintenance, etc. A database 407 is stored in a non-transitory computer readable storage medium (e.g., an electronic, magnetic, optical, electromagnetic, or semiconductor system-based storage device). The database 407 can be remote relative to the processing circuit 401 (as shown), or comprised within the memory circuit 402.

A communication interface 405 is configured to exchange signals with one or more vehicles and trailers 10. The communication interface 405 can comprise an electronic transmitter for transmitting radio, electrical, and/or optical signals, and can further comprise an electronic receiver for receiving radio, electrical, and/or optical signals. In some embodiments, the communication interface 405 is configured to support short-range wireless signaling via BLUETOOTH, RFID, ZIGBEE, and/or WIFI. The communication interface 405 can additionally or alternatively be configured to support long-range wireless communication via cellular- and/or satellite-based signaling. The communication interface 405 can additionally or alternatively be configured to support signaling over a wired connection, such as a serial, USB, micro USB, FIREWIRE, Lightning, and/or Thunderbolt connection. There can be more than one communications interface 405. In such embodiments that support radio communication, an antenna (not illustrated) can be configured for the transmitting and receiving of wireless signals to and from the remote sources. The controller 400 can also include a clock 406 to measure various timing aspects.

The communication interface 405 can include a web interface for users to access their account and obtain various information. The web interface can support a website through which the contents of the database 407 are accessible. In one or more embodiments the web interface provides browser-based access to the contents of the database 407. The different users can login to the browser-based interface and access the pertinent usage information as well as schedule fuel dispensing. The browser-based interface can support well-known browsers such as Internet Explorer and Mozilla Firefox, Safari, Chrome.

Alternatively, the different users can obtain information from the database 407 using one or more Application Programming Interfaces (APIs) through a user device. Also, in one or more embodiments the web interface supports access to the database 407 using web services in addition to, or as an alternative to, the browser-based interface.

The controller 400 can monitor the status of the one or more trailers 10. For each trailer 10, this can include monitoring the amount of fuel, the amount and times of dispensed fuel, and information about the fuel (e.g., recent fuel contamination results based on sensor readings, when the fuel has been moved through the fuel system 11, etc). The controller 400 can also track when fuel has been added to the trailer 10 during a refueling event.

The controller 400 can also control the coordinated activities of the network of trailers 10. The controller 400 can receive fuel requests from the vehicles and schedule the trailers 10 for fueling. This can include the controller 400 monitoring the status and the amount of fuel at the trailers 10. Based on this information, the controller 400 is able to direct the vehicles to one of the trailers 10 that is able to provide the fuel.

Figure 27:
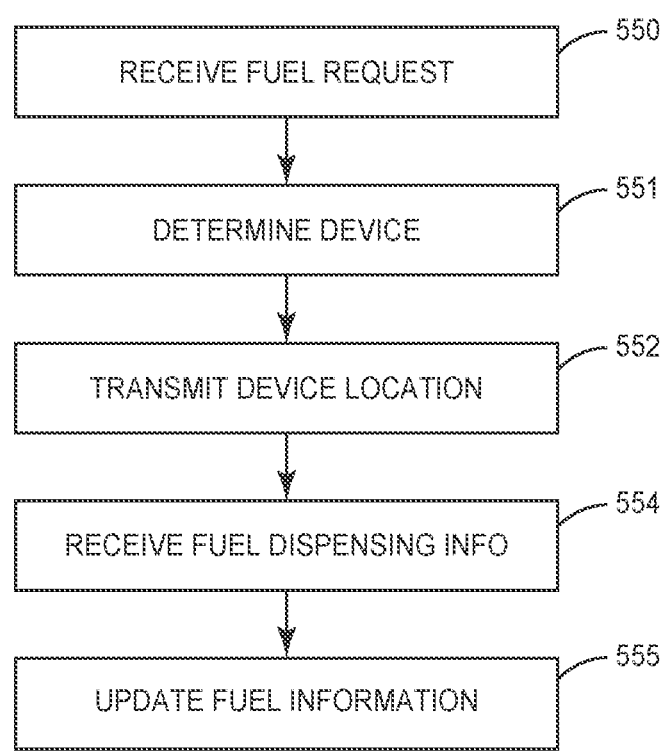
FIG. 27 is a flowchart diagram of a method performed by a controller of coordinating dispensing of fuel from a trailer to a vehicle.

FIG. 27 illustrates a method of a controller 400 coordinating the fueling process. The controller 400 initially receives a request for fuel from a vehicle (block 550). The request can include one or more of an amount of needed fuel, a time when fuel is needed, and a current location of the vehicle.

The controller 400 determines which trailer 10 to direct the vehicle to for dispensing of the fuel (block 551). This location can be based on the location of the vehicle when the request is received and the amount of fuel requested. The controller 400 can determine the closest trailer 10 to the vehicle at the time the request was received. The controller 400 can also determine a more distance trailer 10, such as one with a larger fuel capacity in the event additional fuel could be necessary. The location of the trailer 10 is then transmitted to the vehicle (block 552). This can include the geographic location as well as any particular instructions for reaching the vehicle. This can also include specific information to dispense the fuel, such as a passcode to activate the fueling system 11 to dispense the fuel.

After the fuel has been dispensed to the vehicle, the controller 400 receives dispensing information (block 554). This information can be received from the trailer 10 and/or the trailer that received the fuel. The information can include the amount of dispensed fuel, the time the fuel was dispensed, etc. The controller 400 receives the information and updates the fuel information about the trailer 10 for future purposes.

When the amount of fuel remaining in a trailer 10 falls below a predetermined amount, the controller 400 can schedule additional fuel to be delivered to the trailer 10. In this manner, the controller 400 is able to maintain the full network of usable trailers 10 that are available for fuel.

The controller 400 can also monitor the condition of the fuel system 11 within the trailer 10. This can include the length of time the various components have been in use in the trailer 10, and the amount of fuel that has been filtered by the fuel system 11. The controller 400 can also receive signals from one or more of the sensors 104. The controller 400 can use this information to schedule maintenance of the trailer 10 as necessary. In the event the controller 400 determines an issue, the controller 400 can place the trailer 10 out of service and prevent fuel dispensing until the issue has addressed by a technician.

The trailer 10 can include one or more control systems 100. One design includes a single control system 100 that oversees the functionality. Other designs include two or more separate control systems 100. Each control system 100 can be configured to control the functionality of a different aspect of the trailer 10. In one example, a first control system 100 oversees the polishing aspects of the fuel, and a second control system 100 communicates with the controller 400.

Different devices 10 can be used to store and transport fluid according to aspects of this disclosure. A trailer 10 is one example of a device 10. Another device 10 includes a skid device that includes rails or a platform on the bottom that contacts against and is pulled over the ground.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention can be carried out in other specific ways than those herein set forth without departing from the scope and essential characteristics of the invention. The present embodiments are, therefore, to be considered in all respects as illustrative and not restrictive.

What is claimed is:

1. A trailer to store and transport fluid, the trailer comprising:
   a chassis with a hitch to be configured to be towed by a vehicle;
   wheels mounted to the chassis to move the trailer;
   a tank constructed from aluminum and with an enclosed interior space to contain a fluid, the tank comprising: opposing pairs of planar sides with first and second lateral sides, top and bottom sides, and front and back sides; and at least one baffle positioned in the interior space to restrain the flow of the fluid, the at least one baffle comprising a curved shape along an axis that extends through the front and back sides.

2. The trailer of claim 1, wherein the interior space comprises a substantially rectangular sectional shape in a plane perpendicular to the axis that extends through the front and back sides, the rectangular sectional shape comprising rounded corners in the plane.

3. The trailer of claim 2, wherein the tank comprises eight rounded corners, each of the rounded corners comprises a three dimensional concave shape and is positioned at a joinder of three of the sides.

4. The trailer of claim 1, wherein the tank comprises rounded corners and rounded edges that extend between the corners, each of the rounded corners comprising a three dimensional concave shape for a continuous rounded shape along three of the sides.

5. The trailer of claim 1, wherein the aluminum is an aluminum alloy.

6. The trailer of claim 1, further comprising one or more cabinets mounted to the chassis at the front side of the tank, the one or more cabinets each comprising an interior and a door that is movable between an open position and a closed position.

7. The trailer of claim 1, wherein the tank comprises a width measured between the first and second lateral sides, a height measured between the top and bottom sides, and a length measured between the front and back sides, the tank having a length that is greater than the height and the width.

8. The trailer of claim 1, wherein each of the at least one baffle is connected to each of the first and second lateral sides and each of the top and bottom sides, each of the at least one baffle comprises one or more openings that allow the fluid to move through the baffle within the interior space.

9. The trailer of claim 1, wherein the at least one baffle comprises an opening and a gate is positioned at the opening, the gate is configured to be movable with an actuator between an open position away from the opening and a closed position extending across the opening.

10. A method of making the trailer of claim 1 that is configured to store and transport fluid, the method comprising:
forming the tank comprising:
bending first and second sheets with each of the sheets comprising two planar sections and an intermediate bend that extends a longitudinal length of the sheet;
welding together along two weld seams exposed edges of the first and second sheets and forming a tubular structure with open first and second ends;
welding a first end section to the first end of the tubular structure and welding a second end section to the second end of the tubular structure and forming the enclosed interior space that contains the fluid; and
mounting the tank to the chassis with the first end facing towards a front of the chassis and the second end facing towards a back of the chassis.

11. The method of claim 10, further comprising forming rounded corners at the first end section and the second end section with the rounded corners having a three dimensional concave shape.

12. The method of claim 10, further comprising attaching the at least one baffle within an interior of the tubular structure between the first and second ends.

13. The method of claim 12, further comprising mounting two or more of the baffles within the interior of the tubular structure and spacing the baffles apart along a length of the tank between the first and second end sections.

14. The method of claim 10, further comprising mounting a hitch at a front end of the chassis, the hitch configured to be attached to a vehicle to pull the trailer.

15. A trailer to store and transport fluid, the trailer comprising:
a tank constructed from aluminum and with an enclosed interior space to contain a fluid, the tank comprising pairs of opposing planar sides with first and second lateral sides, top and bottom sides, and front and back sides, the tank comprising rounded corners that have a three dimensional concave shape for a continuous rounded shape along three of the sides;
baffles positioned within the interior space between the front and back sides, the baffles being bowed across the width of the interior space between the first and second lateral sides; and
a chassis that supports the tank, the chassis configured to be towed by a vehicle.

16. The trailer of claim 15, wherein the tank comprises rounded edges that extend between the rounded corners.

17. The trailer of claim 15, wherein the tank comprises the width measured between the first and second lateral sides, a height measured between the top and bottom sides, and a length measured between the front and back sides, the tank having a length that is greater than the height and the width.

18. The trailer of claim 15, wherein the interior space comprises a substantially rectangular sectional shape in a plane perpendicular to an axis that extends through the front and back sides, the rectangular sectional shape comprising the rounded corners in the plane.

19. The trailer of claim 15, wherein the aluminum is an aluminum alloy.

* * * * *